US007908576B2

(12) United States Patent
Huang et al.

(10) Patent No.: US 7,908,576 B2
(45) Date of Patent: Mar. 15, 2011

(54) METHOD OF PROGRESSIVELY PROTOTYPING AND VALIDATING A CUSTOMER'S ELECTRONIC SYSTEM DESIGN

(75) Inventors: Thomas B. Huang, San Jose, CA (US); Chioumin M. Chang, San Jose, CA (US)

(73) Assignee: INPA Systems, Inc., San Jose, CA (US)

( * ) Notice: Subject to any disclaimer, the term of this patent is extended or adjusted under 35 U.S.C. 154(b) by 455 days.

(21) Appl. No.: 11/953,366

(22) Filed: Dec. 10, 2007

(65) Prior Publication Data

US 2009/0150838 A1 Jun. 11, 2009

(51) Int. Cl.
*G06F 17/50* (2006.01)
(52) U.S. Cl. ........ 716/106; 716/107; 716/111; 716/112; 716/124; 716/136
(58) Field of Classification Search .................. 716/4, 5, 716/7, 16, 17, 105, 106, 107, 111, 112, 124, 716/136
See application file for complete search history.

(56) References Cited

U.S. PATENT DOCUMENTS

| 6,080,204 | A * | 6/2000 | Mendel ............................ 716/7 |
| 6,389,379 | B1 | 5/2002 | Lin |
| 6,701,491 | B1 | 3/2004 | Yang |
| 7,107,567 | B1 * | 9/2006 | LeBlanc ......................... 716/17 |
| 7,480,609 | B1 * | 1/2009 | Cavanagh et al. .............. 703/23 |
| 2004/0153308 | A1 | 8/2004 | McMillan |
| 2005/0114809 | A1 | 5/2005 | Lu |
| 2006/0184350 | A1 | 8/2006 | Huang |

OTHER PUBLICATIONS

PCT International Search Report for Int'l. App. No. PCT/US2008/083009, dated Mar. 12, 2009, 4 pages.
PCT Written Opinion of the International Searching Authority for Int'l. App. No. PCT/US2008/083009, dated Mar. 12, 2009, 5 pages.
Kim, Namseung et al. "Virtual Chip: Making Functional Models Work on Real Target Systems" Design Automation Conference, Jun. 15, 1998, XP010309233, ISBN: 978-0-89791-964-7, pp. 170-173.
Lee, Seungjong et al., "Interface Synthesis between Software Chip Model and Target Board" Journal of Systems Architechture, Elsevier Science Publishers BV., Amsterdam, NL vol. 48, No. 1-3, Sep. 1, 2002, pp. 49-57.
PCT International Search Report for Int'l. App. No. PCT/US2008/083003, dated Mar. 12, 2009, 4 pages.
PCT Written Opinion of the International Searching Authority for Int'l. App. No. PCT/US2008/083003, dated Mar. 12, 2009, 6 pages.

* cited by examiner

*Primary Examiner* — Vuthe Siek
(74) *Attorney, Agent, or Firm* — Edward C. Kwok; Haynes and Boone, LLP

(57) ABSTRACT

A method for prototyping and validating a customer's electronic system design (ESD) with design data is proposed. The design data is partitioned into hierarchical design elements (HDEs) plus their respective test benches. The ESD couples with customer's customer peripheral devices CPDs via their peripheral interface terminals PITs thus forming interconnected hierarchical system elements (HSEs) interacting with one another according to a functional validation specification. The HSEs form numerous system hierarchy levels (SHLs). The method includes:
a) Providing a reprogrammable logic device (RPLD) with an RPLD-interface and programmable external interfaces PXIFs respectively connected to the PITs.
b) Providing a simulation software tool.
c) Disabling all PXIFs via RPLD-interface. (For each disabled PXIF, identifying HDEs connected to the PXIF and appending their test benches with stimuli and responses to form appended test benches.
d) Progressively verifying and validating all HSEs against the functional validation specification following an upward movement along the SHLs.

19 Claims, 21 Drawing Sheets

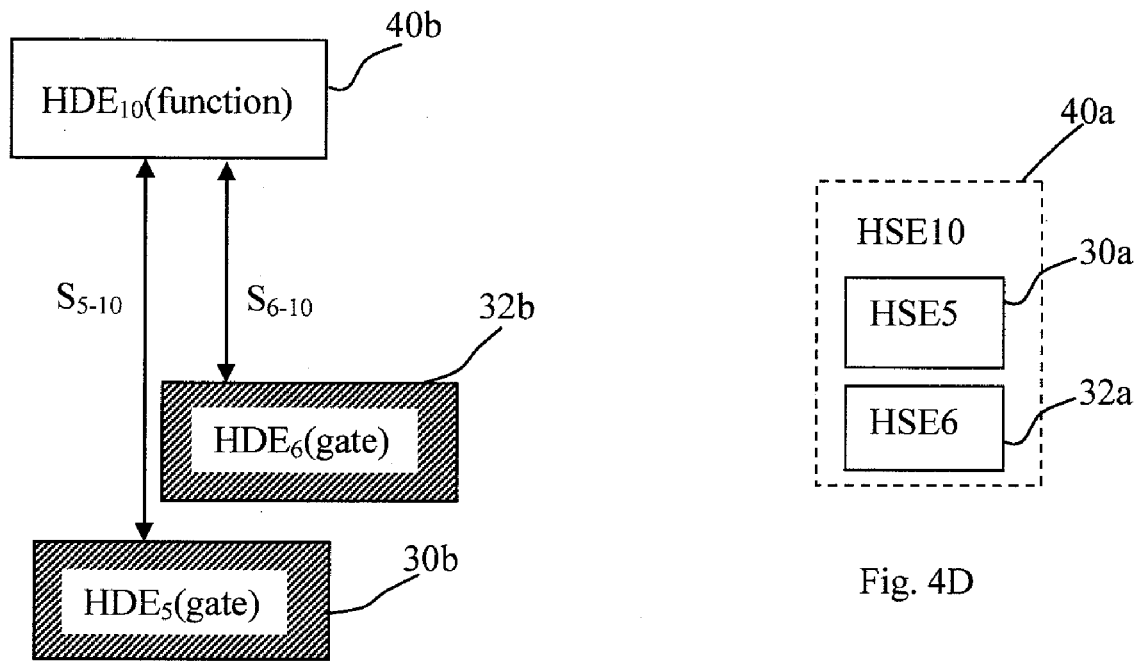
Fig. 4C
Fig. 4D
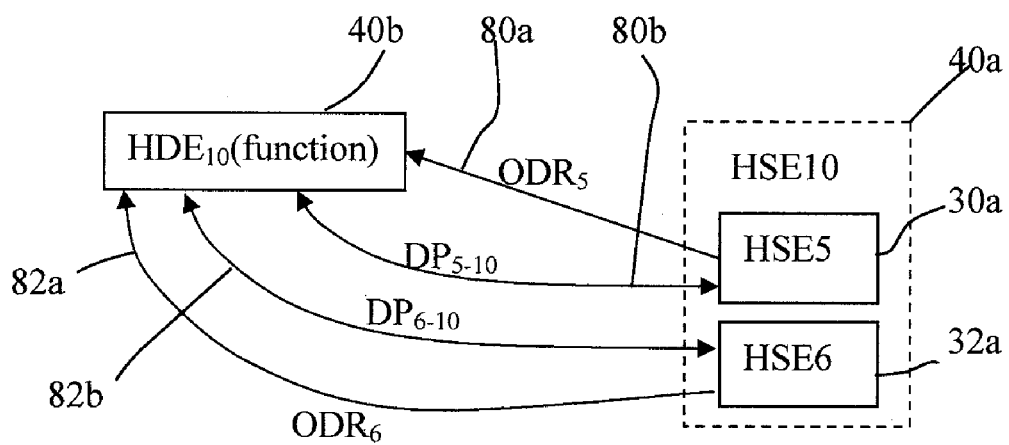
Fig. 4E

METHOD OF PROGRESSIVELY PROTOTYPING AND VALIDATING A CUSTOMER'S ELECTRONIC SYSTEM DESIGN

FIELD OF INVENTION

The present invention relates generally to design and validation methods and techniques applicable to designing complex electronic circuits. In particular, the present invention relates to a methodology for verifying and validating electronic circuit designs that are particularly applicable to system-on-a-chip and ultra large scale integrated circuit type electronic circuits.

BACKGROUND OF THE INVENTION

As the level of integration continues to advance, many complex electronic logic systems can now be implemented on a single integrated circuit (IC). Such an IC, often known as "system on a chip (SoC)" or "ultra large scale integrated circuit (ULSI)" in the art, includes multiple complex components (e.g., micro-processor, digital signal processor, peripheral and memory controllers), many of which may be individually obtained as "off-the-shelf" electronic circuit designs from numerous vendors in the market. These electronic circuit designs are known as "IPs[1]" to those skilled in the art.

[1] The term "IP" stands for "intellectual property." Designers of these electronic circuits provide the designs to their customers in the form of data files which are readable by popular electronic design automation (EDA) tools. The customers of these designers then integrate these "IPs" into their own circuit designs. As an IP vendor does not provide a manufactured article here—the electronic deign is typically provided as design data represented in electronic form (e.g., stored in a storage medium, such as a compact disk, or as a stream of bits downloaded from a server via the Internet)—it has become customary in the art to refer to such electronic circuit design products as "IPs".

In U.S. Pat. No. 6,701,491, entitled "Input/output probing apparatus and input/output probing method using the same, and mixed emulation/simulation method based on it" by Yang, an interactive environment is disclosed for IC designers to conduct emulation sessions back and forth between a hardware accelerator and a software simulator. Correspondingly, memory states and logic storage node states are swapped between the accelerator and the simulator. A complete context switch is performed to create a time-shared environment on the hardware accelerator, so that the hardware accelerator can be shared among multiple IC designers. In general, in a similar manner, multiple accelerators can be interconnected with multiple simulators and multiple workstations to allow multiple designers to do interactive operations and to shift back and forth between hardware emulation and software simulation.

A mixed emulation and simulation method is also disclosed by Yang. Here, input/output hardware probing is performed by emulation for verification. At least one semiconductor chip is used which implements an extended design verification target circuit by adding an IOP-probing supplementary circuit to the design verification target circuit. The IOP-probing supplementary circuit includes an input/output probing interface module. In this system, an input/output probing system controller generates the IOP-probing supplementary circuit for the design verification target circuit. The design verification target circuit is implemented in one or more semiconductor chips mounted on a prototyping board or specified by a hardware description language (HDL) code—which indicates the behavior of the IOP-probing supplementary circuit—for simulation on a simulator. Emulation and simulation are then performed in turn for one or more times, as necessary, by exchanging state information in an automated manner between a suitable prototyping board and a suitable simulator. Furthermore, the state information is completely exchanged in an automated manner between the prototyping board and the simulator by the IOP-probing supplementary circuit-based input/output probing. With the IOP-probing supplementary circuit, another mixed emulation/simulation process is also disclosed whose operating mode is conditionally based upon a pre-determined switching condition queue on a time order, switched between simulation and emulation during the process until the operating mode switching queue becomes empty.

In U.S. Pat. No. 6,389,379 entitled "Converification system and method" by Lin, et al, a coverification system and an associated method are disclosed. The coverification system includes a reconfigurable computing system and a reconfigurable computing hardware array. The reconfigurable computing system contains a CPU and memory for processing data for modeling the entire user design in software. In some instances, a target system and external I/O devices are not necessary, as they can be modeled in software. In other instances, the target system and external I/O devices are coupled to the coverification system to achieve speed and to allow use of actual data, rather than simulated test bench data.

The disclosed coverification method by Lin, et al was directing at verifying the proper operation of a user design, while the user design connected to an external I/O device. The method generates a first model of the user design in software for use in simulation, generates a second model of a portion of the user design in hardware, which is controlled by the first model in the software. More specifically, in this system, the data evaluations in the first model in software and the second model in hardware are synchronized using a software-generated clock. For debugging, the method simulates selected debug test points in software, accelerates selected debug test points in hardware and controls the delivery of data among the first model in software, the second model in hardware, and the external I/O device so that the first model in software has access to all delivered data.

In the prior art, designing, debugging, verifying and validating a system that includes a user design integrated with one or more third party IPs is generally difficult, as the user often starts with designing a behavior description or a simulation model of the IP with incomplete control over the IPs logical behavior at the interfaces between the user design and the IPs. In addition, user designs that are specified by behavior simulation models, logic gates and embedded software are extremely difficult to create. In such a system, it is also difficult to isolate system faults. For example, it is difficult to discover errors within an audio or video output data stream, unless the user can "hear" or "see" the rendered audible or visual results. A conventional design verification and validation method therefore prototypes (architects) the system behavior in an EDA (EDA) simulation environment to verify the numerous interface functions. Afterwards, the system separately embodies the EDA-simulated logic into custom application reference board-based validation environments to "hear" or "see" the audible or visual results. The final step in the prototyping involves incorporating the logic into packaged electronic devices according to product-level electrical specification. During this conventional process of design verification and validation, for example, incorrectly behaving output signals of an audio or video decoder due to logic, algorithmic or software programming errors in the user design may manifest themselves in unpredictable audio or display behavior. For a complicated system, unpredictable behavior potentially caused by a logic, algorithmic or software programming error is extremely difficult to diagnose and isolate, whether in the EDA simulation or the application reference board environment. Therefore, a design verification and validation method with associated tools that allows the user (1) to integrate his EDA prototyping simulation process directly with his printed circuit board (PCB) prototype, (2) to quickly isolate or fix design faults, and (3) to quickly verify and validates his PCB prototype in an integrated environment is highly desirable. In essence, such a design verification and validation method would provide the user with a high throughput, end-to-end solution from design verification to system validation.

SUMMARY OF THE INVENTION

A method for progressively prototyping and validating a customer's electronic system design (ESD) with design data is provided, according to one embodiment of the present invention. The customer's ESD data is partitioned into numerous hierarchical design elements $HDE_i$ (i=1, 2, ..., M) together with their respective interconnecting networks and test benches. The ESD data typically couples and interacts with numerous customer peripheral devices $CPD_j$ (j=1, 2, ..., N) via their corresponding peripheral interface terminals $PIT_j$ (j=1, 2, ..., N), thus forming correspondingly interconnected hierarchical system elements $HSE_k$ (k=1, 2, ..., K with k≧1) interacting with one another according to a pre-defined hierarchically structured, functional validation specification. The hierarchical system elements $HSE_k$ further form a number of system hierarchy levels $SHL_m$ (m=1, 2, ..., P). According to one embodiment of the present invention, the method includes:
  a) Providing a reprogrammable logic device (RPLD) with (i) an RPLD-interface for configuring and programming the RPLD, and (ii) programmable external interfaces $PXIF_j$ (j=1, 2, ..., N) respectively connected to the $PIT_j$ (j=1, 2, ..., N).
  b) Providing a simulation software tool that can (i) read the design data, (ii) simulate and (iii) verify each of the $HDE_i$ in conjunction with the test benches.
  c) Disabling all the $PXIF_j$ via the RPLD-interface, and for each $PXIF_k$ so disabled, (i) identifying those $HDE_i$'s having a network connection to the $PXIF_k$, and (ii) appends their test benches with stimuli and responses to form appended test benches that reflect the interactive behavior of the corresponding $CPD_k$.
  d) Progressively verifying and validating all the $HSE_k$ by:
    d1) Identifying a set of HSE candidates which are not yet verified and validated and each of which having no interconnection to another HSE at a lower system hierarchy level that is not yet verified and validated.
    d2) Verifying and validating each member of the HSE candidate set together with its corresponding hierarchical design elements and customer peripheral devices. (Accomplishing this verifying and validating procedure using the simulation software, the test benches, appended test benches, RPLD and functional validation specification.)
    d3) Repeating the above steps d1) and d2) till all members of the set $HSE_k$ (k=1, 2, ..., K) are verified and validated with the now completed RPLD prototype against the functional validation specification.

When an HSE candidate member only includes an HDE, verifying and validating the HSE candidate member further involves verifying the HDE with the simulation software, and its respective test bench. Next, the method converts, by configuring and programming the RPLD, the verified HDE into a corresponding programmed hierarchical element in the RPLD. The method then places and routes all programmed hierarchical elements according to their respective interconnecting networks on the RPLD.

When an HSE candidate member includes an HDE and its coupled CPD, validating the HSE candidate member further involves:
  d21) Verifying the HDE using the simulation software and its respective appended test bench. Thereafter, the method converts, by configuring and programming the RPLD, the verified HDE into a corresponding programmed hierarchical element in the RPLD. The method then places and routes all programmed hierarchical elements according to their respective interconnecting networks on the RPLD.
  d22) Removing the respective appended test benches and enabling a PXIF corresponding to the coupled CPD via the RPLD-interface.
  d23) Validating those portions of the functional validation specification corresponding to the RPLD and a subset of the $CPD_j$ (j=1, 2, ..., N) corresponding to an updated set of enabled PXIF.

While progressively verifying and validating, all the $HSE_k$ normally proceeds in an upward direction along the system hierarchy levels towards the root or roots. Upon detection of an error during the verification or validation process, the method temporarily verifies and validates the $HSE_k$ in a downward direction along the system hierarchy levels towards the leaves, until the bug or bugs in the ESD causing the detected error are discovered and fixed. In one embodiment which monitors the $HSE_k$ behavior, the method inserts a number of error detectors into the ESD at the $SHL_k$ corresponding to the $HSE_k$ and sets up a quarantine area for further bug fixing.

To increase the prototyping and validating throughput for the HSE candidate set with the simulation software, the method identifies a set of hierarchical system elements with no overlapping of their respective input/output signals ("parallel hierarchical system elements"). The method then simultaneously verifies and validates these parallel hierarchical system elements using the simulation software.

For those hierarchical system elements under verification whose input signals include a signal coming from an already programmed hierarchical element, the method samples the signal from the already programmed hierarchical element and then provides the value of the signal to the simulation software. In this way, the method realizes a hybrid prototyping process of joint hardware software simulation with much increased prototyping throughput. Finite logic and hardware propagation delays may lead to a false signal being sampled from the programmed hierarchical element. Therefore, while converting a verified HDE into its corresponding programmed hierarchical element, the method programs the RPLD to provide an output data ready signal as an output signal of the programmed hierarchical element to indicate the validity state of the output signals following a change of any of its input signals. The method then conditionally samples the signal according to the state of the output data ready signal.

For those customers already in possession of a customer RPLD, the method includes, via programming:
  (a) Inserting and configuring the RPLD-interface into the customer RPLD.
  (b) Inserting and configuring the $PXIF_j$ (j=1, 2, ..., N) into the customer RPLD and respectively and (c) connecting them to the $PIT_j$ (j=1, 2, ..., N), thus realizing a cost-saving related to the RPLD.

In a more specific embodiment under the current invention method, the RPLD-interface includes a set of vector generator, configuration interface, error detectors and error alarm.

For those customers already in possession of a test pattern generator and a customer simulation software tool capable of simulating and verifying the hierarchical design elements, the method simply provides a vector generation tool, which interfaces with the customer simulation software and the test pattern generator to interact with the design data at a functional level, thus realizing a cost-saving in the test pattern generator and the simulation software tool.

According to one embodiment of the current invention, the vector generation tool includes a set of configurable simulator interfaces, a configurable test pattern generator, an error detector and an error analyzer.

According to one embodiment of the current invention, the RPLD is a programmably interconnected array of field programmable gate arrays (FPGAs).

These and other aspects of the present invention and their numerous embodiments are further made apparent, in the remainder of the present description, to those of ordinary skill in the art.

BRIEF DESCRIPTION OF THE DRAWINGS

In order to more fully describe numerous embodiments of the present invention, reference is made to the accompanying drawings. However, these drawings are not to be considered limitations in the scope of the invention, but are merely illustrative:

FIG. 2A through FIG. 8B together illustrate the present invention method of progressively verifying and validating the customer's electronic system design and prototype concurrently in the hardware and the EDA software simulation environment; and, in more progressive details;

FIG. 2A and FIG. 2B together illustrate a first initialized state, under the present invention, of the hardware and the EDA software before any verification and validation progress;

FIG. 4C, FIG. 4D and FIG. 4E together illustrate a hybrid prototyping process of joint hardware software simulation under the present invention while verifying a hierarchical design element $HDE_{10}$ between the second state and the third state of progression of the hardware and the EDA software;

FIG. 8A and FIG. 8B together illustrate a sixth state of progression of the hardware and the EDA software upon completion of the final verification and validation process at system hierarchy level five.

DETAILED DESCRIPTION OF SPECIFIC EMBODIMENTS

The description herein, in conjunction with the drawings, merely focus on one or more currently preferred embodiments of the present invention and also describe some exemplary optional features and alternative embodiments. The description and drawings are presented to illustrate and, as such, are not limitations of the present invention. Thus, upon consideration of this disclosure, those of ordinary skill in the art would readily recognize variations, modifications, and alternatives. Such variations, modifications and alternatives should be understood to be also within the scope of the present invention.

Figure 1A:
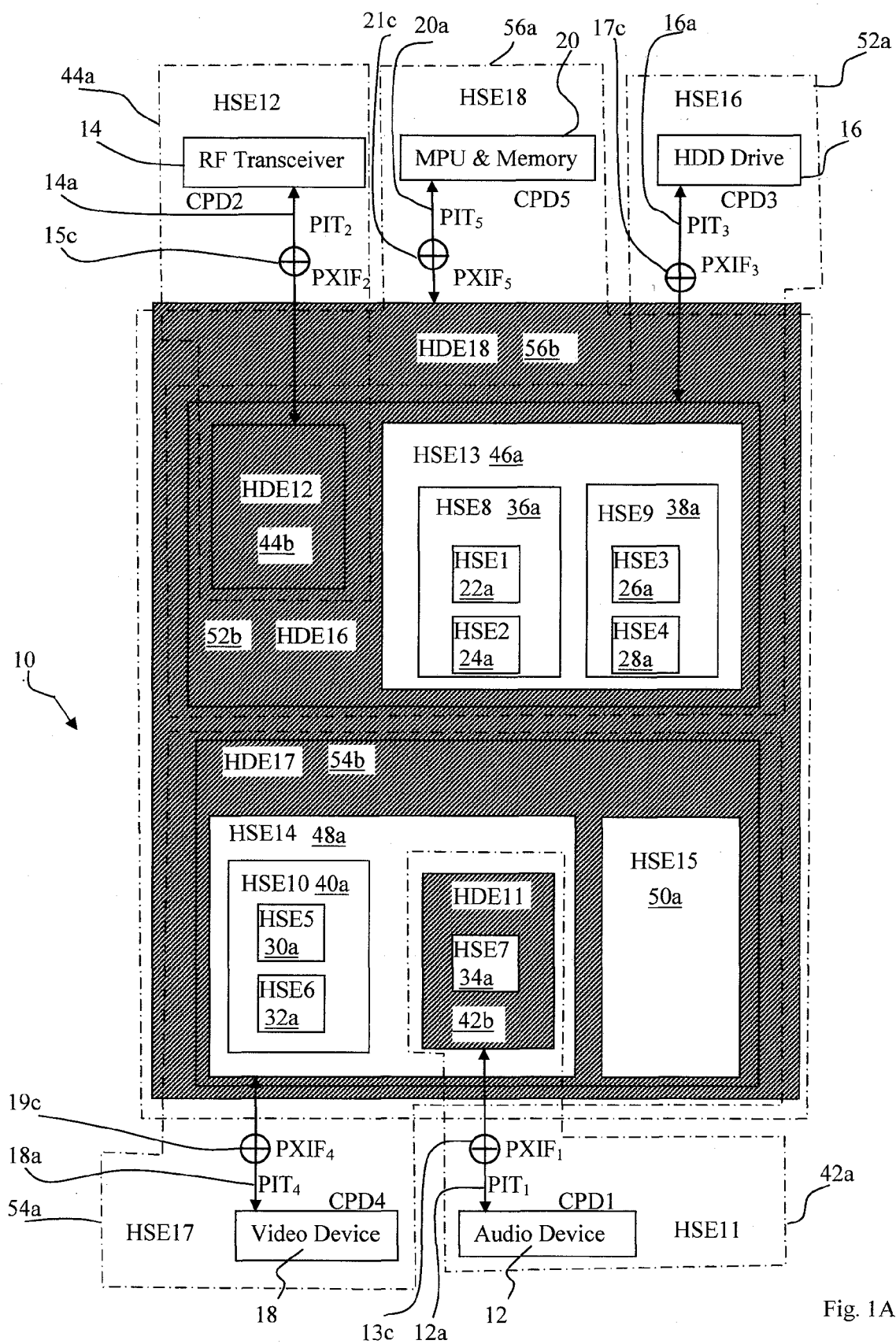
FIG. 1A illustrates the end goal of the present invention that is a customer's verified and validated electronic system prototype including a number of customer peripheral devices all in a hardware environment.
Figure 1B:
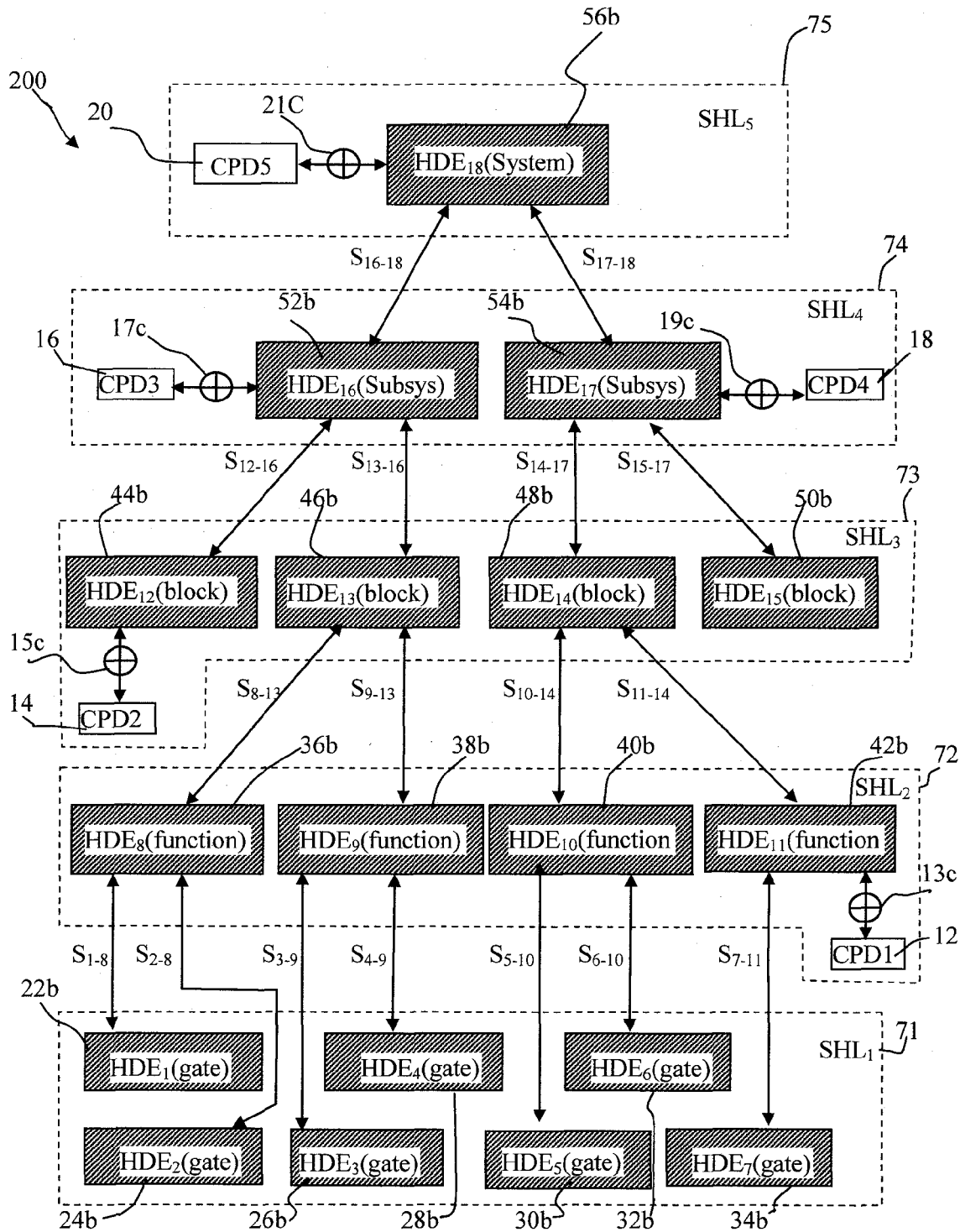
FIG. 1B illustrates, as a side-product of the end goal of the present invention, a customer's verified electronic system design in an EDA software simulation environment corresponding to FIG. 1A but excluding its customer peripheral devices.

FIG. 1A illustrates the end goal of the present invention that is a customer's verified and validated electronic system prototype 10 including a number of coupled customer's existing peripheral devices (CPD) CPD1 12, CPD2 14, CPD3 16, CPD4 18 and CPD5 20 all in a hardware environment. FIG. 1B illustrates, as a side-product of the end goal of the present invention, the customer's verified electronic system design (ESD) 200 in an EDA software simulation environment corresponding to FIG. 1A but excluding any direct physical connection to its customer peripheral devices. For the purpose of this description, the words "verification" and "validation" refer respectively to "verifying the ESD in an EDA software simulation environment" and "validating the electronic system prototype in a physical hardware environment".

As shown in FIG. 1B, the design data of the electronic system design 200 is partitioned into numerous hierarchical design elements (HDE) $HDE_1$ 22b, $HDE_2$ 24b, $HDE_3$ 26b, . . . , $HDE_{18}$ 56b together with their respective interconnecting networks. In this example, five system hierarchical levels (SHL) $SHL_1$ 71, $SHL_2$ 72, $SHL_3$ 73, $SHL_4$ 74 and $SHL_5$ 75 are illustrated with:

$SHL_1$ 71 corresponds to gate level design of lowest complexity.

$SHL_2$ 72 corresponds to function level design of a first higher complexity.

$SHL_3$ 73 corresponds to block level design of a second higher complexity.

$SHL_4$ 74 corresponds to subsystem level design of a third higher complexity.

$SHL_5$ 75 corresponds a top system level design of the highest complexity.

Thus, $HDE_1$ 22b through $HDE_7$ 34b belong to the system hierarchy level $SHL_1$ 71 wherein, for example, the $HDE_2$ 24b itself may be an interconnected group of ten logic gates, the $HDE_5$ 30b itself may be a group of twelve flip flops, and the $HDE_7$ 34b may be a group of twenty serially connected shift registers. $HDE_8$ 36b through $HDE_{11}$ 42b belong to the system hierarchy level $SHL_2$ 72 wherein, for example, the $HDE_9$ 38b may be a 12-bit by 12-bit multiplier and the $HDE_{11}$ 42b may be a 16-bit audio digital-to-analog converter (DAC). $HDE_{12}$ 44b through $HDE_{15}$ 50b belong to the system hierarchy level $SHL_3$ 73 wherein, for example, the $HDE_{12}$ 44b may be a third party digital RF signal processing IP and the $HDE_{14}$ 48b may be a third party video image enhancement IP. $HDE_{16}$ 52b and $HDE_{17}$ 54b belong to the system hierarchy level $SHL_4$ 74 wherein, for example, the $HDE_{16}$ 52b may be an HDD (hard disk drive) controller and the $HDE_{17}$ 54b may be a video display controller. Finally, $HDE_{18}$ 56b may be a portable operating system (OS) at the highest system hierarchy level $SHL_5$ 75.

As examples of the interconnecting networks among the hierarchical design elements, both $HDE_1$ 22b and $HDE_2$ 24b are interconnected to and form part of the $HDE_8$ 36b via network signal $S_{1-8}$ and network signal $S_{2-8}$. As a second example, both $HDE_{10}$ 40b and $HDE_{11}$ 42b are interconnected to and form part of the $HDE_{14}$ 48b via network signal $S_{10-14}$ and network signal $S_{11-14}$. As a third example, both $HDE_{16}$ 52b and $HDE_{17}$ 54b are interconnected to and form part of the $HDE_{18}$ 56b via network signal $S_{16-18}$ and network signal $S_{17-18}$. In general, network signals are bi-directional and each include multiple signal lines effecting stimuli and responses amongst the hierarchical design elements. Therefore, in an EDA software simulation environment the network signals of each hierarchical design element can be modeled as its test bench, simulated and verified accordingly. For example, the network signals $S_{3-9}$, $S_{4-9}$ and $S_{9-13}$ can be modeled as the test bench for the 12-bit by 12-bit multiplier $HDE_9$ 38b, simulated and verified accordingly. As a graphical convention of the present invention, each HDE box is first shown without a fill pattern before any verification with an EDA simulation, but subsequently shown filled with a cross-hatch pattern following verification with an EDA simulation. In the art, the design data of the electronic system design 200 can be expressed in a variety of EDA languages, such as VHDL, Verilog, System C, to name a few. Thus, a simulation software tool is presumed capable of reading the design data, simulating and then verifying each of the HDEs together with their test benches. Technically, the simulation software tool may be cycle-based, transaction-based, formal-based[2], or a combination thereof. A few examples of such simulation software tool include Incisive Simulator from Cadence Design Systems Inc., VCS from Synopsys Inc. and ModelSim from Mentor Graphics Corporation.

[2] For more detailed description, see published US patent applications US 20050114809 entitled "Design verification using formal techniques" and US 20040153308 entitled "Method and system for design verification using proof-based abstraction" these are hereby incorporated for reference.

Corresponding to the hierarchical partition of the design data into the above HDEs and their respective interconnecting networks, the customer's verified and validated electronic system prototype 10 of FIG. 1A also embodies similar hierarchical partition in hardware, now individually named hierarchical system elements (HSE), with the exception of some differences due to the coupled CPDs. Thus, $HSE_1$ 22a through $HSE_7$ 34a represent the electronic hardware embodiment of the $HDE_1$ 22b through the $HDE_7$ 34b. $HSE_8$ 36a through $HSE_{10}$ 40a represent the electronic hardware embodiment of the $HDE_8$ 36b through the $HDE_{10}$ 40b. However, $HSE_1$ 142a represents the electronic hardware embodiment of the $HDE_{11}$ 42b together with its coupled CPD1 12. Likewise, $HSE_{17}$ 54a represents the electronic hardware embodiment of the $HDE_{17}$ 54b together with its coupled CPD4 18, etc. The fact that both $HDE_1$ 22b and $HDE_2$ 24b form part of the $HDE_8$ 36b is now indicated by enclosing both $HSE_1$ 22a and $HSE_2$ 24a within the $HSE_8$ 36a in the electronic system prototype 10. Likewise, the fact that both $HDE_{10}$ 40b and $HDE_{11}$ 42b form part of the $HDE_{14}$ 48b is now indicated by enclosing both $HSE_{10}$ 40a and $HSE_{11}$ 42a within the $HSE_{14}$ 48a in the electronic system prototype 10. In FIG. 1A, all programmed HSEs have been placed and routed according to their respective interconnecting networks. As a graphical convention of the present invention, each HSE box is bordered with dashed line before any verification and validation with EDA simulation and hardware validation, but subsequently bordered with dash-dot line (_._.) following verification and validation with EDA simulation and hardware validation. The following are examples of the various CPDs illustrated in FIG. 1A:
CPD1 12: Audio Device.
CPD2 14: radio frequency (RF) Transceiver.
CPD3 16: hard disk drive (HDD) drive.
CPD4 18: Video Device.
CPD5 20: microprocessor unit (MPU) & Memory.

To those skilled in the art, a successful hardware validation requires that the set of HSEs interact with one another and with the CPDs according to a pre-defined hierarchically structured functional validation specification. As an example, the functional validation specification may include the following:

Upon occurrence of an RF-based audio signal at the CPD2 14 (e.g., an RF transceiver), the same received audio signal as buffered through the CPD3 16 (e.g., an HDD Drive) and processed with the $HDE_{18}$ 56b (e.g., a portable OS) should commence playback within 2 seconds.

Under the present invention the electronic system prototype 10, excluding the numerous CPDs, should be implemented with a reprogrammable logic device (RPLD) such as a programmably interconnected array of field programmable gate arrays (FPGAs). The RPLD should also have an RPLD-interface for its configuration and programming. The RPLD should further have a number of programmable external interfaces PXIF, either enabled or disabled via programming through its RPLD-interface, for connection to the respective CPDs. Thus, as shown in FIG. 1A:

The $HSE_{11}$ 42a has an $HDE_{11}$ 42b and a CPD1 12, the CPD1 12 has a peripheral interface terminal (PIT) $PIT_1$ 12a connected to an enabled $PXIF_1$ 13c. In this state the enabled $PXIF_1$ 13c thus effects a coupling between the CPD1 12 and the $HDE_{11}$ 42b.

The $HSE_{17}$ 54a has an $HDE_{17}$ 54b and a CPD4 18, the CPD4 18 has a $PIT_4$ 18a connected to an enabled $PXIF_4$ 19C. In this state the enabled $PXIF_4$ 19c thus effects a coupling between the CPD4 18 and the $HDE_{17}$ 54b.

The $HSE_{18}$ 56a has an $HDE_{18}$ 56b and a CPD5 20, the CPD5 20 has a $PIT_5$ 20a connected to an enabled $PXIF_5$ 21c. In this state the enabled $PXIF_5$ 21c thus effects a coupling between the CPD5 20 and the $HDE_{18}$ 56b, etc.

In view of the above and as part of the present invention, the following conditions pertaining to the states of a PXIF are introduced and illustrated using CPD1 12 as an example:

(A) Simply disable $PXIF_1$, the resulting disabled $PXIF_1$ is graphically illustrated by: ←⊖→

(B) Disable $PXIF_1$ but then append the test bench of $HDE_{11}$ 42b with a stimuli and responses to form an appended test bench for $HDE_{11}$ 42b. In this case, the appended stimuli and responses should reflect the interactive behavior of the CPD1 12. The resulting disabled $PXIF_1$ is graphically illustrated by: ←⊗⊖→

(C) Enable $PXIF_1$, the resulting enabled $PXIF_1$ is graphically illustrated by: ←⊕→

With this scheme, the present invention allows an initial simulation and verification of each HDE in an EDA software simulation environment under condition (B) without the major complication of its coupled CPD, if such a CPD exists. Afterwards, the HDE is programmed into an HSE and the PXIF can be enabled to allow validation of the HSE under condition (C) with its coupled CPD. Especially for a highly complex HDD Drive like the CPD3 16, the appended stimuli and responses for reflecting the interactive behavior of the CPD3 16 can only expect to be its rough approximation for the initial simulation and verification of $HDE_{16}$ 52b. The rough approximation does not present a real problem as the CPD3 16 will be coupled to the $HSE_{16}$ 52a during its validation phase.

FIG. 2A through FIG. 8B together illustrate within the scope of the present invention a method for progressively verifying and validating the customer's electronic system design 200 and electronic system prototype 10 concurrently in the hardware and the EDA software simulation environment.

Figure 2A:
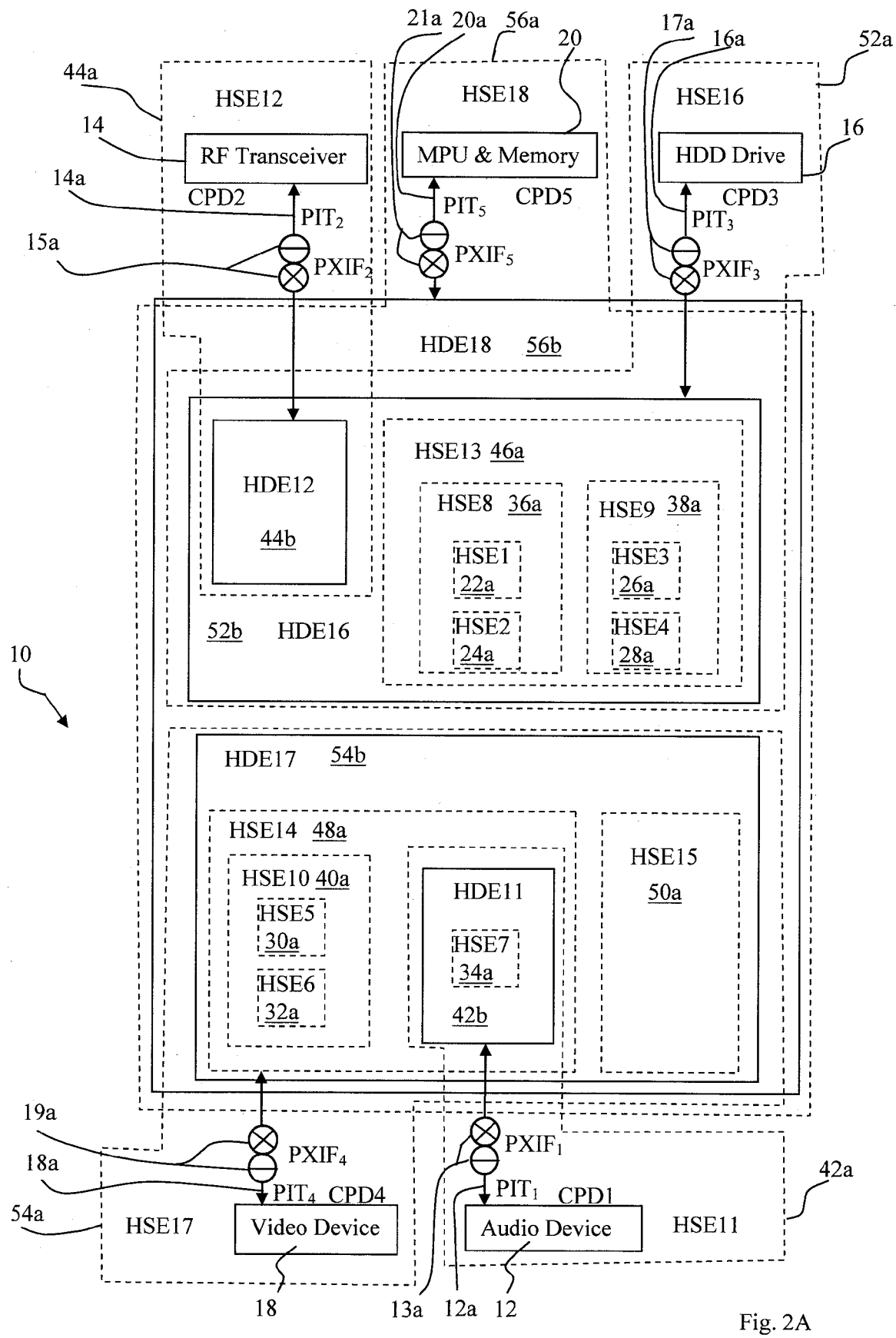
Figure 2B:
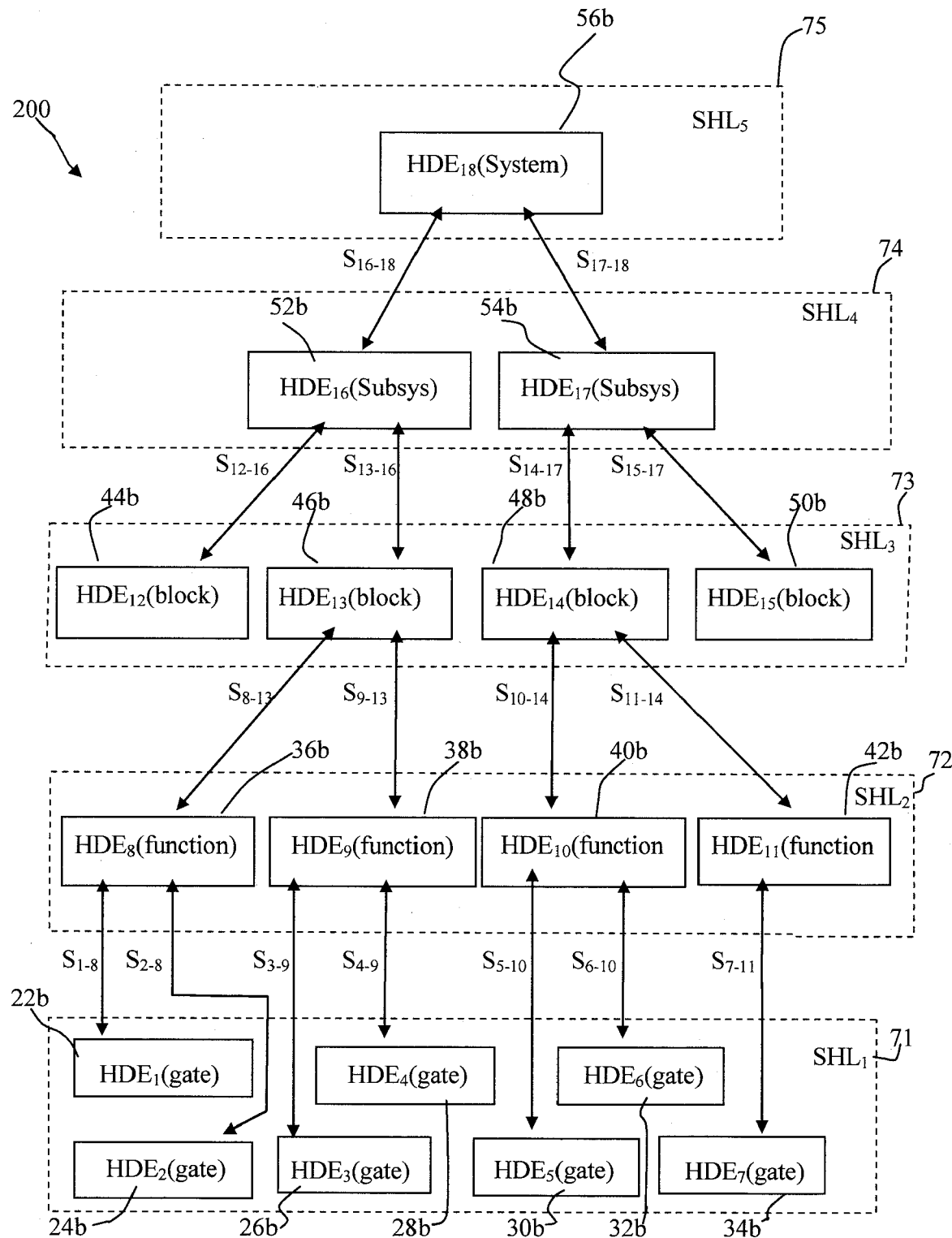

FIG. 2A and FIG. 2B together illustrate a first initialized state of the hardware and the EDA software before any verification and validation. As explained above, all the PXIFs are disabled (disabled $PXIF_1$ 13a, disabled $PXIF_2$ 15a, disabled $PXIF_3$ 17a, disabled $PXIF_4$ 19a and disabled $PXIF_5$ 21a) under condition (B) to allow an initial simulation and verification of each HDE in an EDA software simulation environment without the major complication of its coupled CPD. Notice each HDE box is shown without a fill pattern in FIG. 2B and each HSE box is bordered with dashed line in FIG. 2A.

Figure 3A:
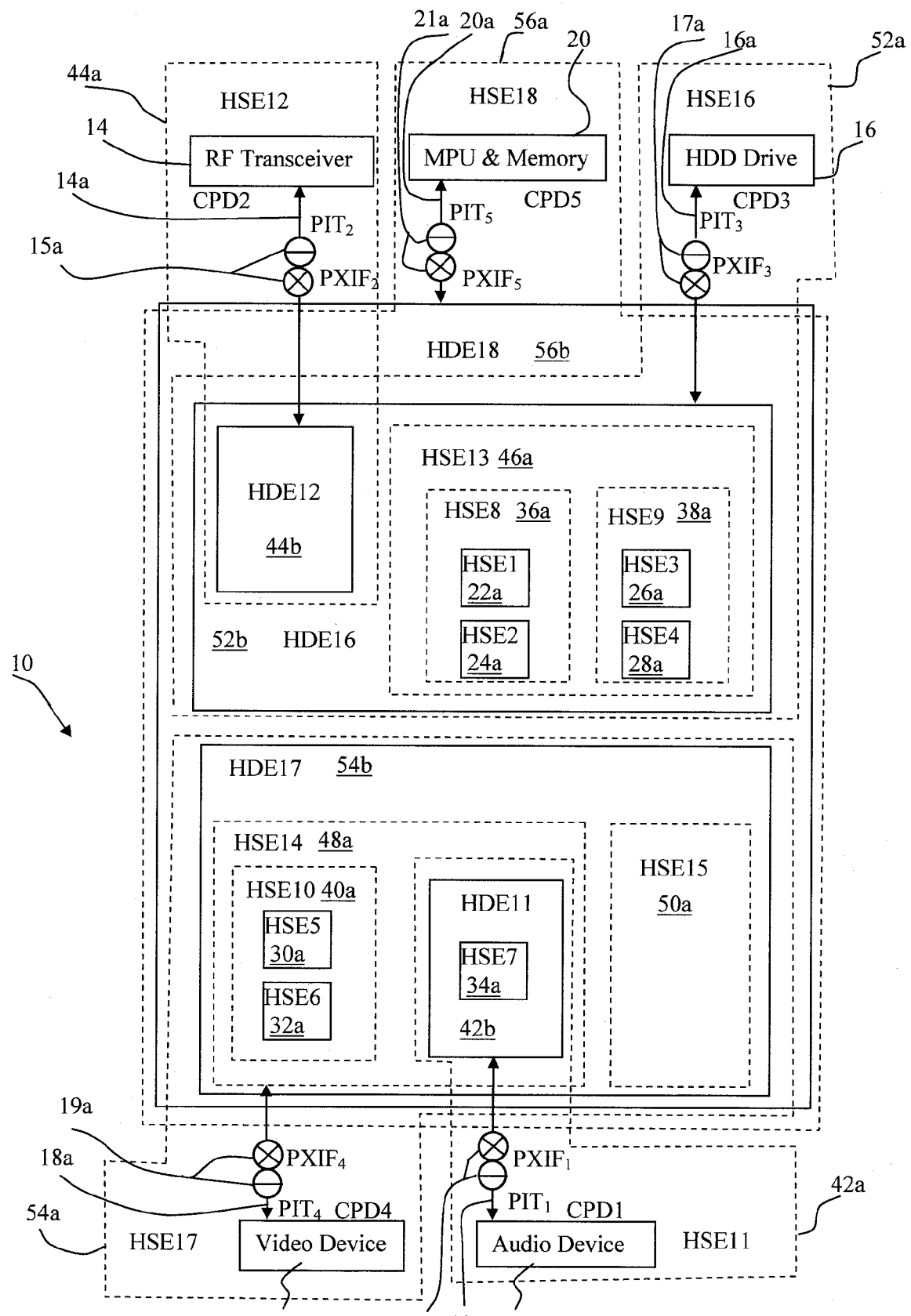
FIG. 3A and FIG. 3B together illustrate a second state of progression of the hardware and the EDA software upon completion of the verification and validation process at system hierarchy level one.
Figure 3B:
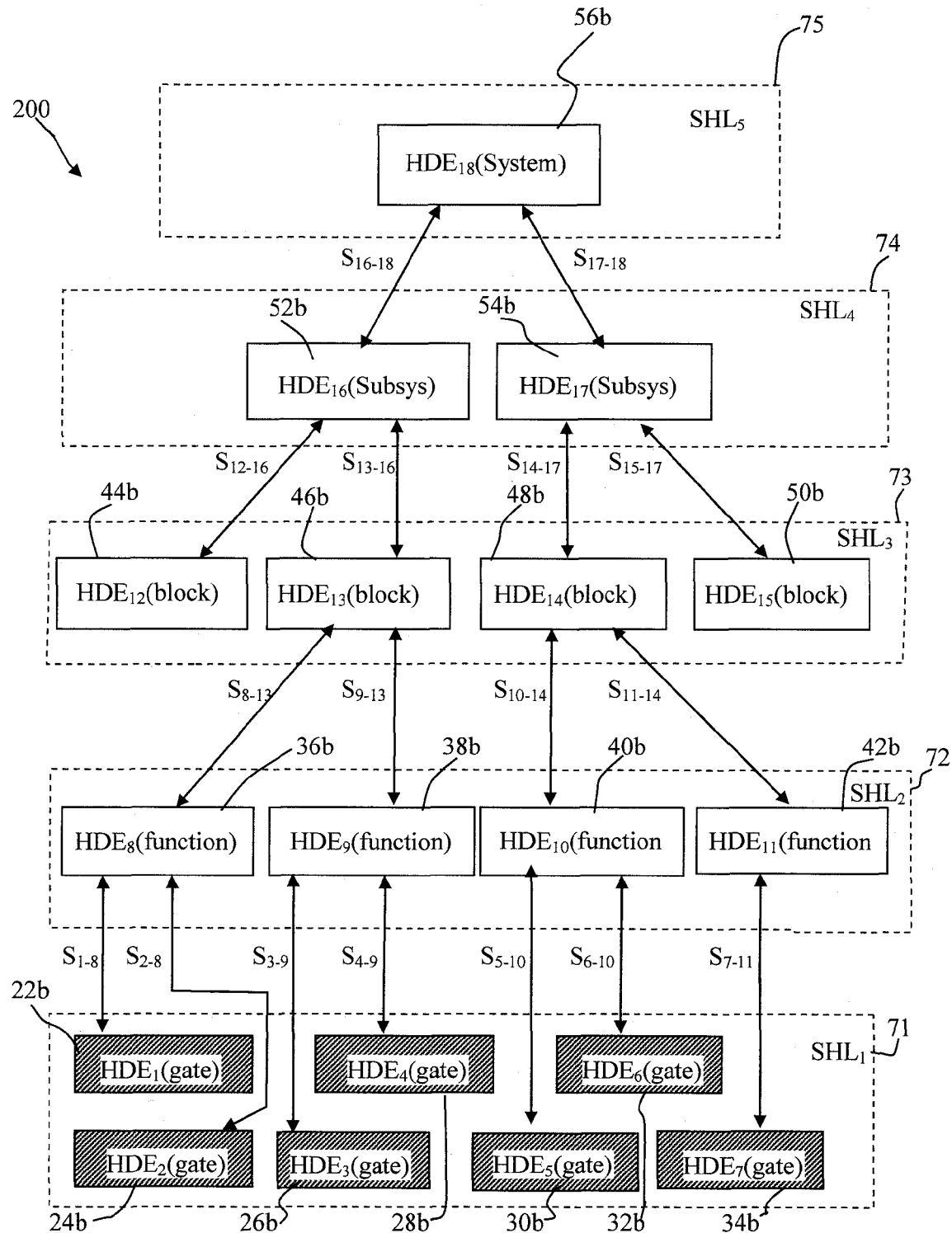

FIG. 3A and FIG. 3B together illustrate a second state of progression of the hardware and the EDA software upon completion of the verification and validation process at system hierarchy level $SHL_1$ 71, the lowest hierarchy of the customer's electronic system design 200. Here, the $HDE_1$ 22b through $HDE_7$ 34b together with their respective test benches have been simulated and verified with a simulation software tool. More specifically, a test bench for the $HDE_3$ 26b models the network signal $S_{3-9}$. A test bench for the $HDE_7$ 34b models the network signal $S_{7-11}$. $HDE_1$ 22b through $HDE_7$ 34b do not overlap in their respective network signals ($S_{1-8}$, $S_{2-8}$, $S_{3-9}$, $S_{4-9}$, $S_{5-10}$, $S_{6-10}$, $S_{7-11}$). Thus $HDE_1$ 22b through $HDE_7$ 34b are effectively parallel HDEs. If so desired, $HDE_1$ 22b through $HDE_7$ 34b can be simultaneously simulated and verified with a simulation software tool in a multi-processing environment to increase the prototyping throughput. Thereafter, $HDE_1$ 22b through $HDE_7$ 34b are configured and programmed, placed and routed into $HSE_1$ 22a through $HSE_7$ 34a on an RPLD.

Figure 4A:
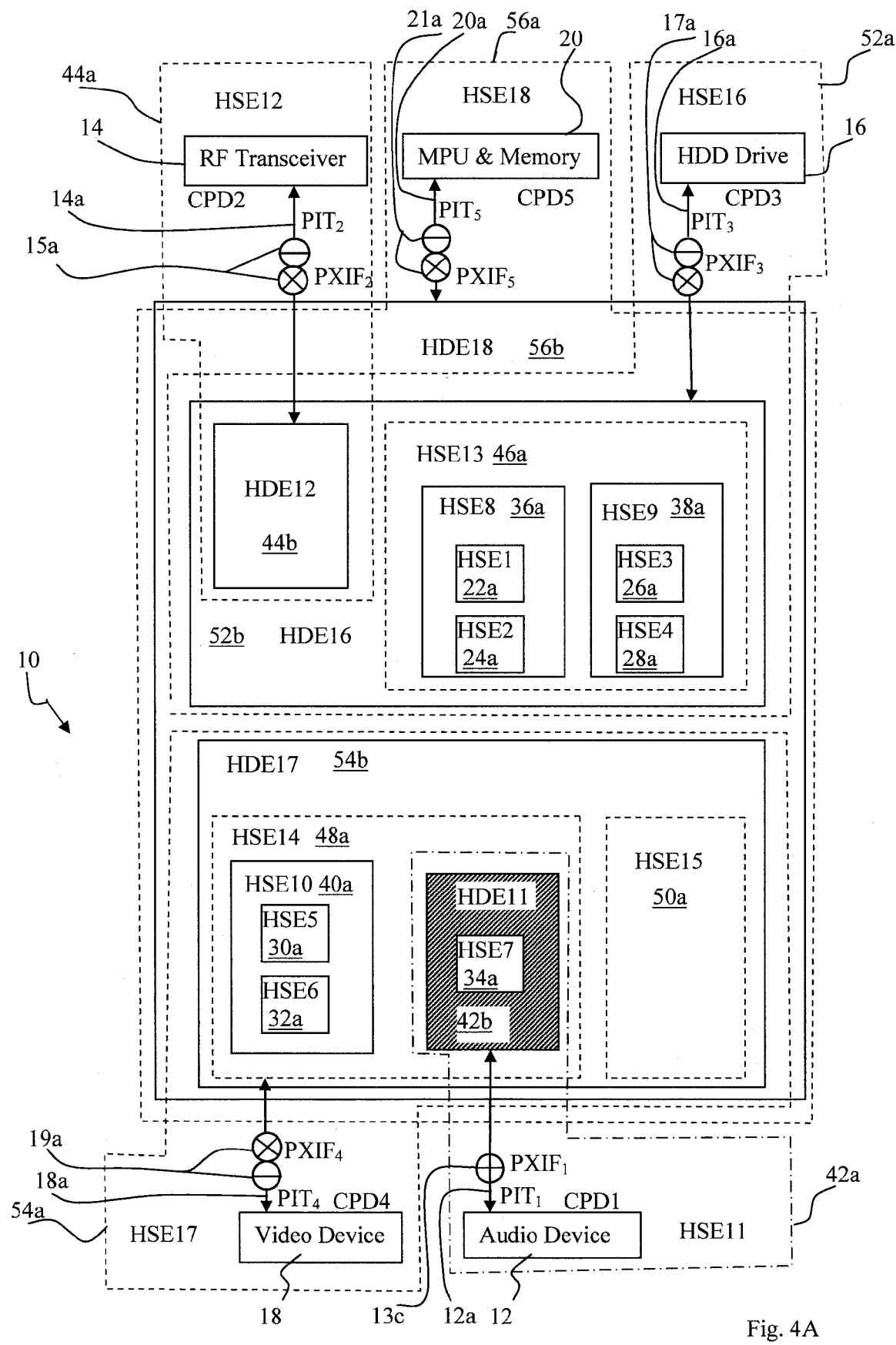
FIG. 4A and FIG. 4B together illustrate a third state of progression of the hardware and the EDA software upon completion of the verification and validation process at system hierarchy level two.
Figure 4B:
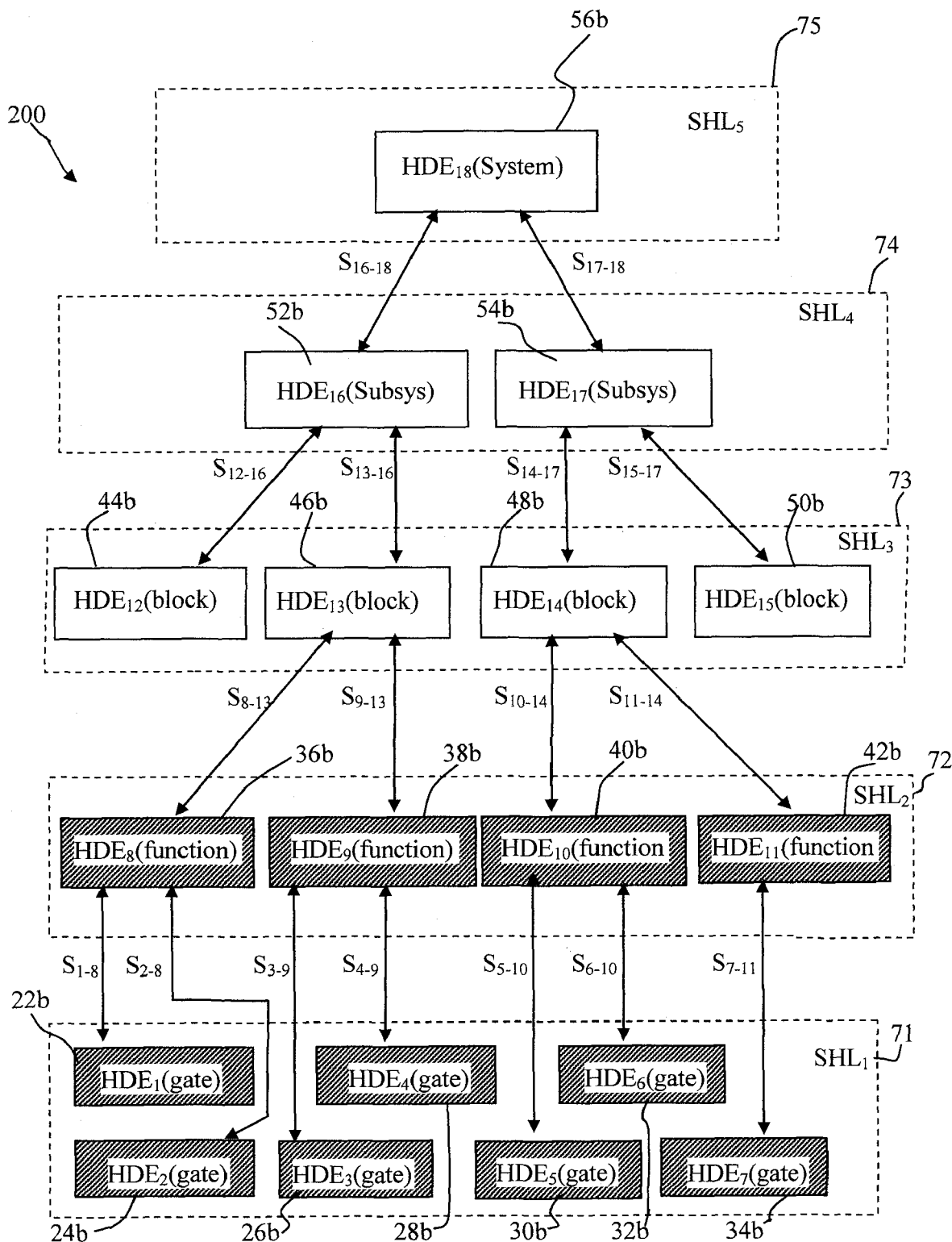

FIG. 4A and FIG. 4B together illustrate a third state of progression of the hardware and the EDA software upon completion of the verification and validation process at a higher system hierarchy level $SHL_2$ 72 of the customer's electronic system design 200. Here, the $HDE_8$ 36b through $HDE_{11}$ 42b together with their respective test benches have been simulated and verified with a simulation software tool. More specifically, a test bench for the $HDE_8$ 36b models network signals $S_{1-8}$, $S_{2-8}$, $S_{8-13}$. A test bench for the $HDE_9$ 38b models network signals $S_{3-9}$, $S_{4-9}$, $S_{9-13}$. $HDE_8$ 36b through $HDE_{11}$ 42b do not overlap their respective network signals ($S_{1-8}$, $S_{2-8}$, $S_{8-13}$, $S_{3-9}$, $S_{4-9}$, $S_{9-13}$, $S_{5-10}$, $S_{6-10}$, $S_{10-14}$, $S_{7-11}$, $S_{11-14}$). Thus $HDE_8$ 36b through $HDE_{11}$ 42b are effectively parallel HDEs. If so desired, $HDE_8$ 36b through $HDE_{11}$ 42b can be simultaneously simulated and verified with a simulation software tool in a multi-processing environment to increase the prototyping throughput. Thereafter, $HDE_8$ 36b through $HDE_{11}$ 42b are configured and programmed, placed and routed into $HSE_8$ 36a through $HSE_{11}$ 42a on an RPLD. In FIG. 4A, the verified $HDE_{11}$ 42b is coupled to the CPD1 12 through an enabled $PXIF_1$ 13c under condition (C) and a $PIT_1$ 12a, whereas in FIG. 3A the unverified $HDE_{11}$ 42b is separated from the CPD1 12 through a disabled $PXIF_1$ 13a under condition (B) and the $PIT_1$ 12a. This means, as described before, during the simulation and verification of $HDE_{11}$ 42b the test bench of $HDE_{11}$ 42b has been appended with stimuli and responses to form an appended test bench for $HDE_{11}$ 42b with the appended stimuli and responses reflecting the interactive behavior of the CPD1 12. After successful verification, the verified $HDE_{11}$ 42b is configured and programmed on an RPLD. The appended test bench is then removed and the $PXIF_1$ enabled (into condition (C)) by programming via the RPLD-interface. Finally, those portions of the functional validation specification corresponding to the as-programmed RPLD and a subset of the CPDs corresponding to an updated set of enabled PXIFs are validated.

FIG. 4C, FIG. 4D and FIG. 4E together illustrate a hybrid prototyping process of joint hardware software simulation under the present invention while verifying the $HDE_{10}$ 40b between the second state and the third state of progression of the hardware and the EDA software.

As indicated in FIG. 4C and FIG. 4D, the $HDE_{10}$ 40b under simulation receives its network signals $S_{5-10}$ from $HDE_5$ 30b that has already been verified and programmed into $HSE_5$ 30a on an RPLD hardware. Likewise, the other network signals $S_{6-10}$ are received from $HDE_6$ 32b that has also been verified and programmed into $HSE_6$ 32a on an RPLD hardware. Therefore, those portions of the test bench for $HDE_{10}$ 40b associated with the network signals $S_{5-10}$ can be implemented by sampling the network signals $S_{5-10}$ from the already programmed $HSE_5$ 30a hardware in real-time. The values of the network signals $S_{5-10}$ into the simulation software thus realize a hybrid prototyping process of joint hardware and software simulation with increased prototyping throughput (due to hardware acceleration). The increase in prototyping throughput, as compared to a scheme of pure software simulation, is expected to rise correspondingly, as the level of hardware integration of the electronic system prototype 10 advances. At such hardware integration level, pure software simulation with even high performance computers is limited in its throughput. Similarly, those portions of the test bench for $HDE_{10}$ 40b associated with the network signals $S_{6-10}$ can be implemented by sampling the network signals $S_{6-10}$ from the already programmed $HSE_6$ 32a hardware and providing the values of the network signals $S_{6-10}$ into the simulation software. The resulting hybrid simulation environment is illustrated in FIG. 4E where the $HDE_{10}$ 40b under simulation receives the network signals $S_{5-10}$ from $HSE_5$ 30a via data paths $DP_{5-10}$ 80b and receives the network signals $S_{6-10}$ from $HSE_6$ 32a via data paths $DP_{6-10}$ 82b.

To prevent the simulation software from sampling a false hardware signal from $HSE_5$ 30a or $HSE_6$ 32a due to logic and hardware propagation delays, the HSEs are further programmed to provide output "data ready" signals $ODR_5$ 80a and $ODR_6$ 82a. The $ODR_5$ 80a of $HSE_5$ 30a indicates the state of validity of its output network signals $S_{5-10}$ following a change of any of its input signals. The simulation software then conditionally samples the network signals $S_{5-10}$ via the $DP_{5-10}$ 80b according to the state of the $ODR_5$ 80a. Similarly, the $ODR_6$ 82a of $HSE_6$ 32a indicates the state of validity of its output network signal network signals $S_{6-10}$ following a change of any of its input signals. The simulation software then conditionally samples the network signals $S_{6-10}$ via the $DP_{6-10}$ 82b data paths according to the state of the $ODR_6$ 82a. Other HDEs qualified for the described hybrid prototyping process between the second state and the third state of progression of the hardware and the EDA software are $HDE_8$ 36b, $HDE_9$ 38b and $HDE_{11}$ 42b.

Figure 5A:
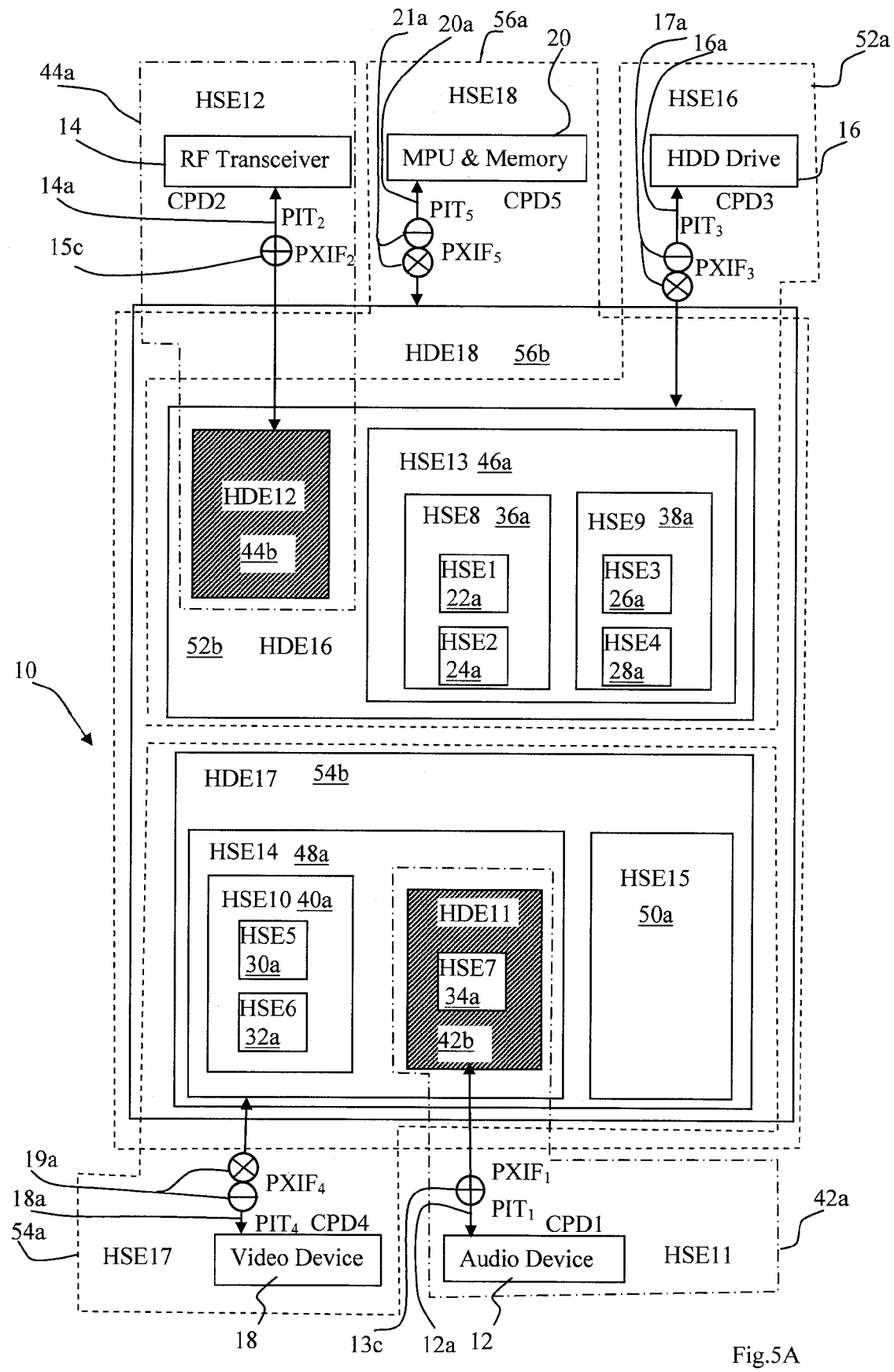
FIG. 5A and FIG. 5B together illustrate a fourth state of progression of the hardware and the EDA software upon completion of the verification and validation process at system hierarchy level three.
Figure 5B:
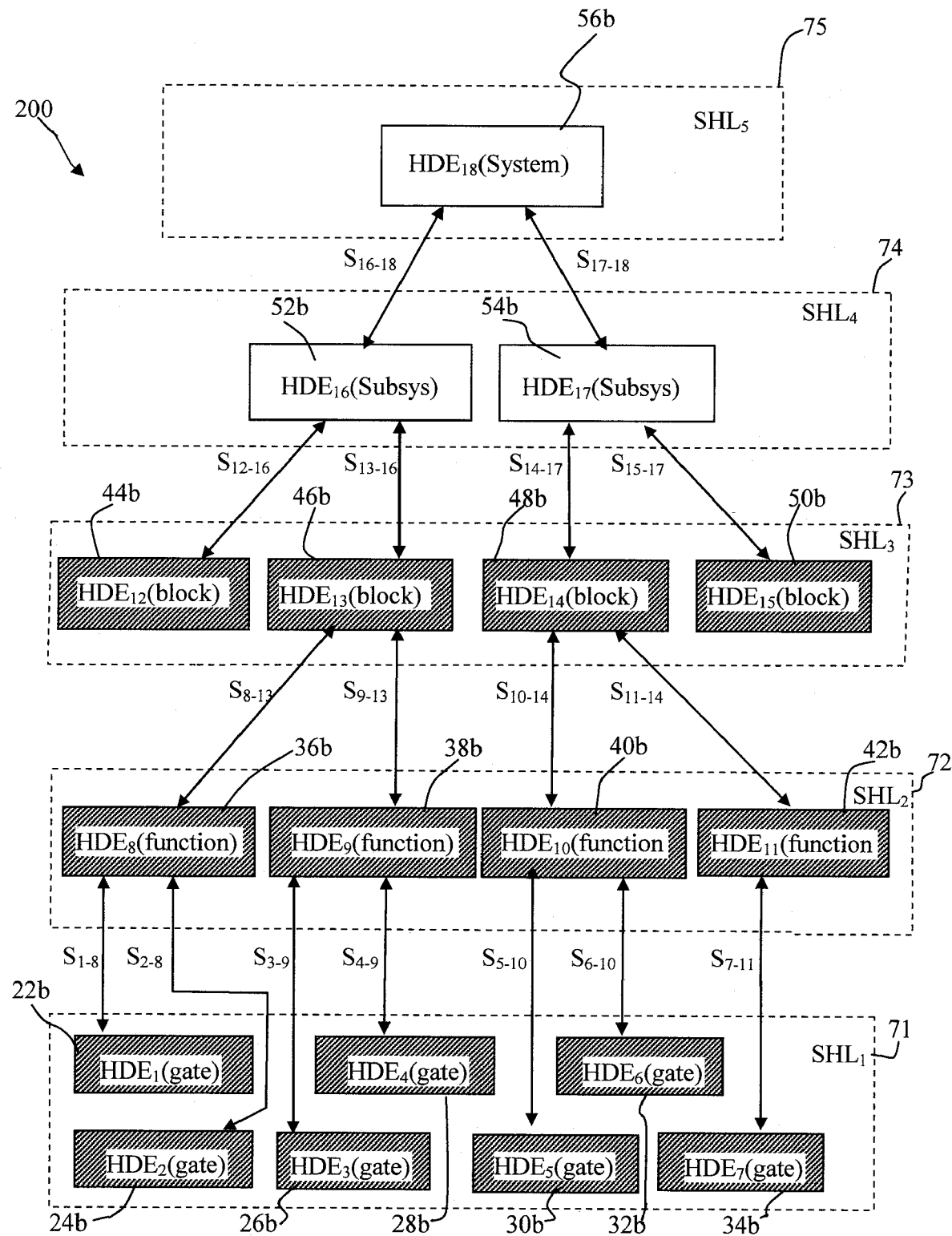

FIG. 5A and FIG. 5B together illustrate a fourth state of progression of the hardware and the EDA software upon completion of the verification and validation process at a higher system hierarchy level $SHL_3$ 73 of the customer's electronic system design 200. Here, the $HDE_{12}$ 44b through $HDE_{15}$ 50b together with their respective test benches have been simulated and verified with a simulation software tool. If so desired, $HDE_{12}$ 44b through $HDE_{15}$ 50b can be simultaneously simulated and verified with a simulation software tool in a multi-processing environment to increase the prototyping throughput. Thereafter, $HDE_{12}$ 44b through $HDE_{15}$ 50b are configured and programmed, placed and routed into $HSE_{12}$ 44a through $HSE_{15}$ 50a on an RPLD. During the simulation and verification of $HDE_{12}$ 44b the test bench of $HDE_{12}$ 44b has been appended with stimuli and responses to form an appended test bench for $HDE_{12}$ 44b with the appended stimuli and responses reflecting the interactive behavior of the CPD2 14. After successful verification, the verified $HDE_{12}$ 44b is configured and programmed on an RPLD. The appended test bench is then removed and the $PXIF_2$ enabled (into condition (C)) by programming via the RPLD-interface. Finally, those portions of the functional validation specification corresponding to the as-programmed RPLD and a subset of the CPDs corresponding to an updated set of enabled PXIFs are validated. The HDEs qualified for the hybrid prototyping process between the third state and the fourth state of progression of the hardware and the EDA software are $HDE_{12}$ 44b, $HDE_{13}$ 46b and $HDE_{14}$ 48b.

Figure 6A:
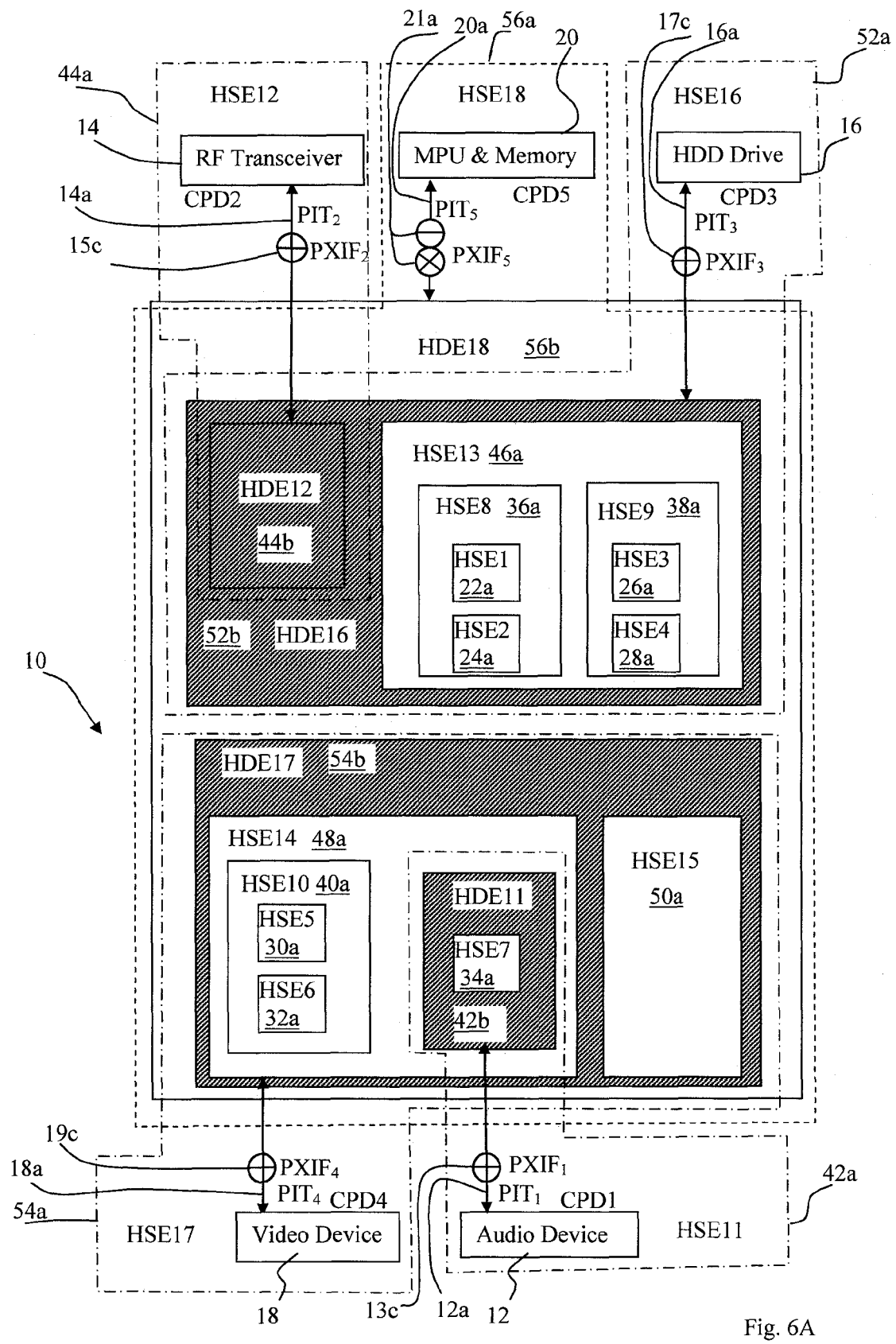
FIG. 6A and FIG. 6B together illustrate a fifth state of progression of the hardware and the EDA software upon completion of the verification and validation process at system hierarchy level four.
Figure 6B:
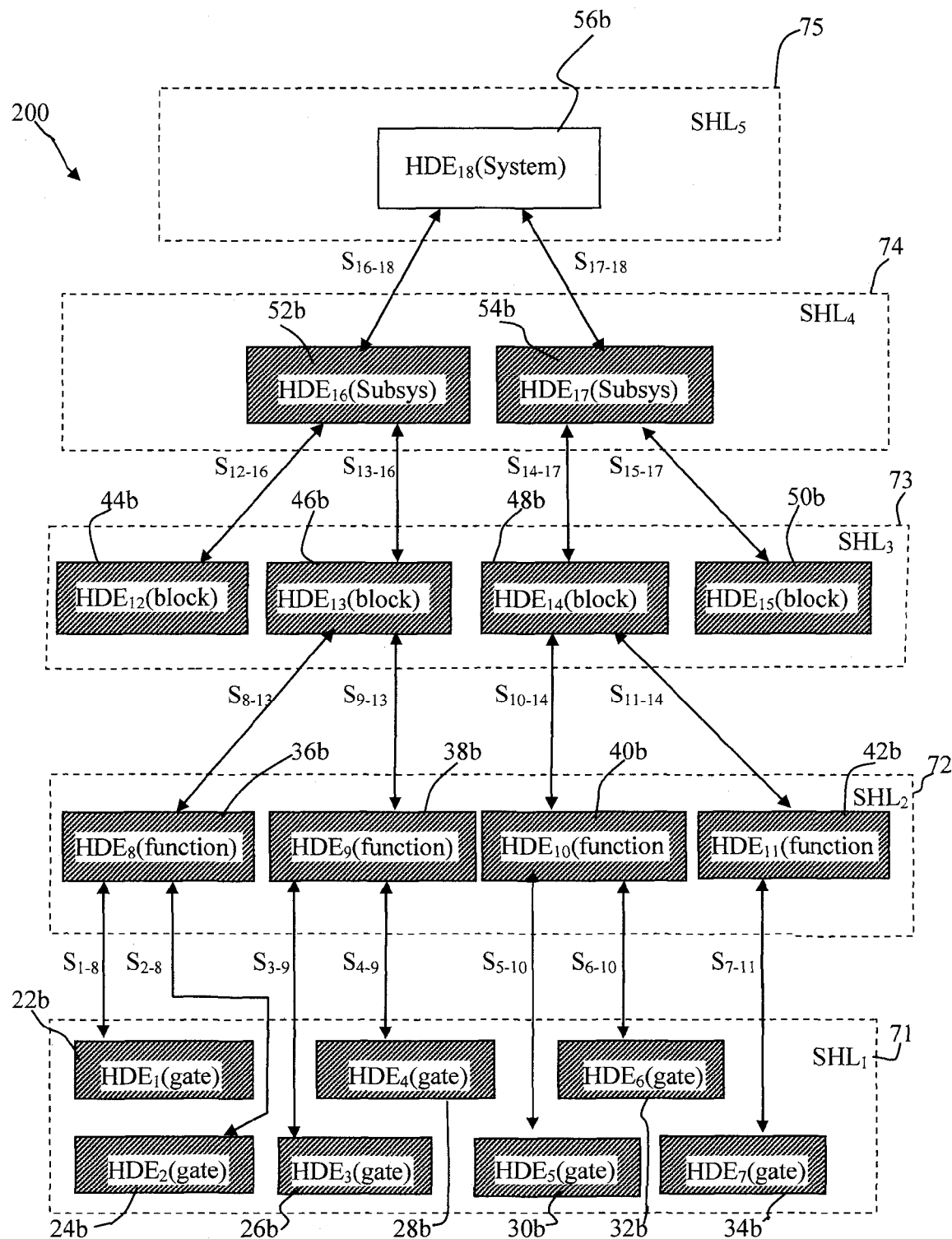

FIG. 6A and FIG. 6B together illustrate a fifth state of progression of the hardware and the EDA software upon completion of the verification and validation process at a higher system hierarchy level $SHL_4$ 74 of the customer's electronic system design 200. Here, the $HDE_{16}$ 52b through $HDE_{17}$ 54b together with their respective test benches have been simulated and verified with a simulation software tool. If so desired, $HDE_{16}$ 52b through $HDE_{17}$ 54b can be simultaneously simulated and verified with a simulation software tool in a multi-processing environment to increase the prototyping throughput. Thereafter, $HDE_{16}$ 52b through $HDE_{17}$ 54b are configured and programmed, placed and routed into $HSE_{16}$ 52a through $HSE_{17}$ 54a on an RPLD. During the simulation and verification of $HDE_{16}$ 52b the test bench of $HDE_{16}$ 52b has been appended with stimuli and responses to form an appended test bench for $HDE_{16}$ 52b with the appended stimuli and responses reflecting the interactive behavior of the CPD3 16. After successful verification, the verified $HDE_{16}$ 52b is configured and programmed on an RPLD. The appended test bench is then removed and the $PXIF_3$ enabled (into condition (C)) by programming via the RPLD-interface. During the simulation and verification of $HDE_{17}$ 54b the test bench of $HDE_{17}$ 54b has been appended with stimuli and responses to form an appended test bench for $HDE_{17}$ 54b with the appended stimuli and responses reflecting the interactive behavior of the CPD4 18. After successful verification, the verified $HDE_{17}$ 54b is configured and programmed on an RPLD. The appended test bench is then removed and the $PXIF_4$ enabled (into condition (C)) by programming via the RPLD-interface. Finally, those portions of the functional validation specification corresponding to the as-programmed RPLD and a subset of the CPDs corresponding to an updated set of enabled PXIFs are validated. The HDEs qualified for the hybrid prototyping process between the fourth state and the fifth state of progression of the hardware and the EDA software are $HDE_{16}$ 52b and $HDE_{17}$ 54b.

Figure 7A:
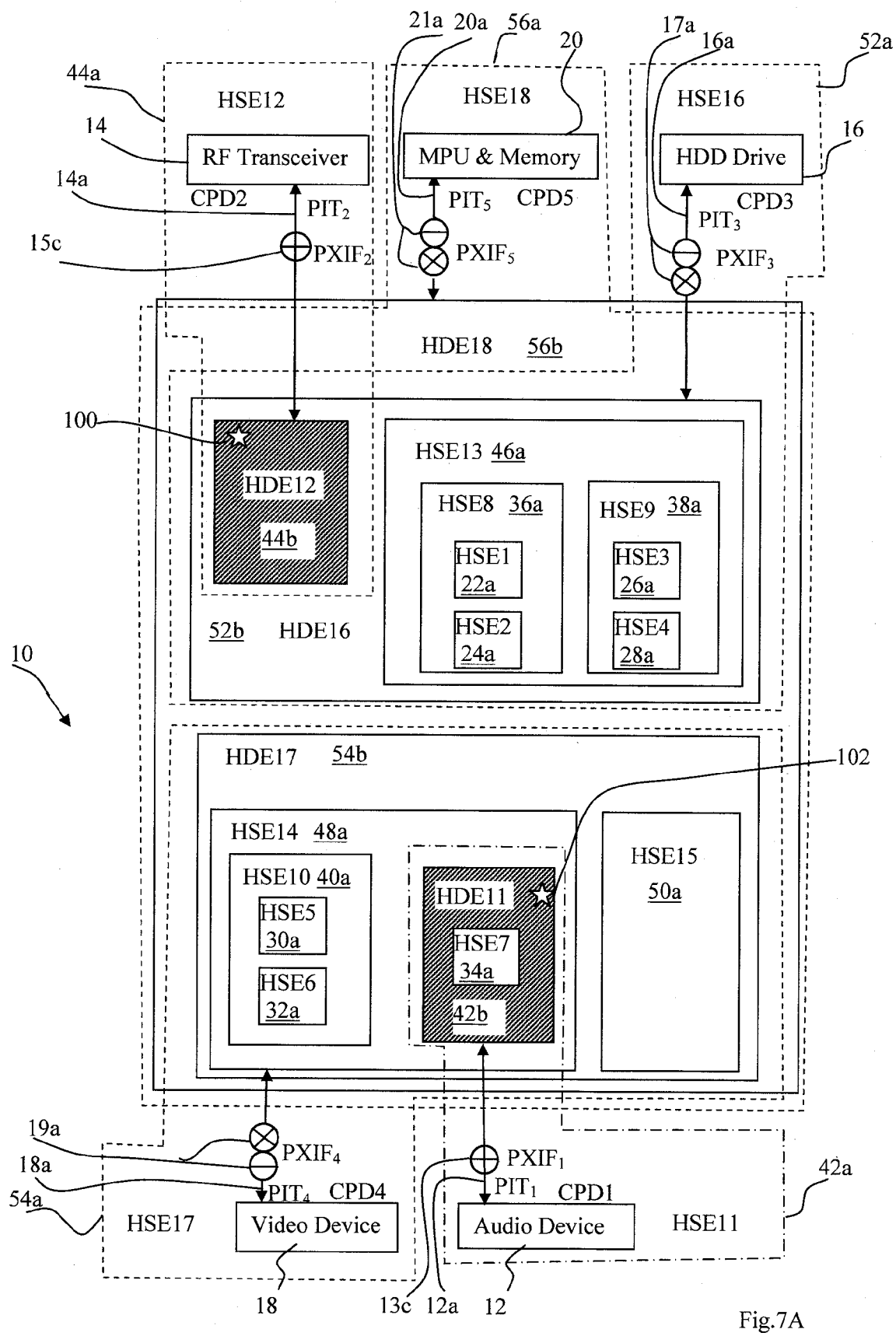
FIG. 7A through FIG. 7G together illustrate an error detection and bug fixing procedure under the present invention while validating a hierarchical system element $HSE_{12}$ with an enabled customer peripheral device CPD2 (RF transceiver) between the third state and the fourth state of progression of the hardware and the EDA software.
Figure 7B:
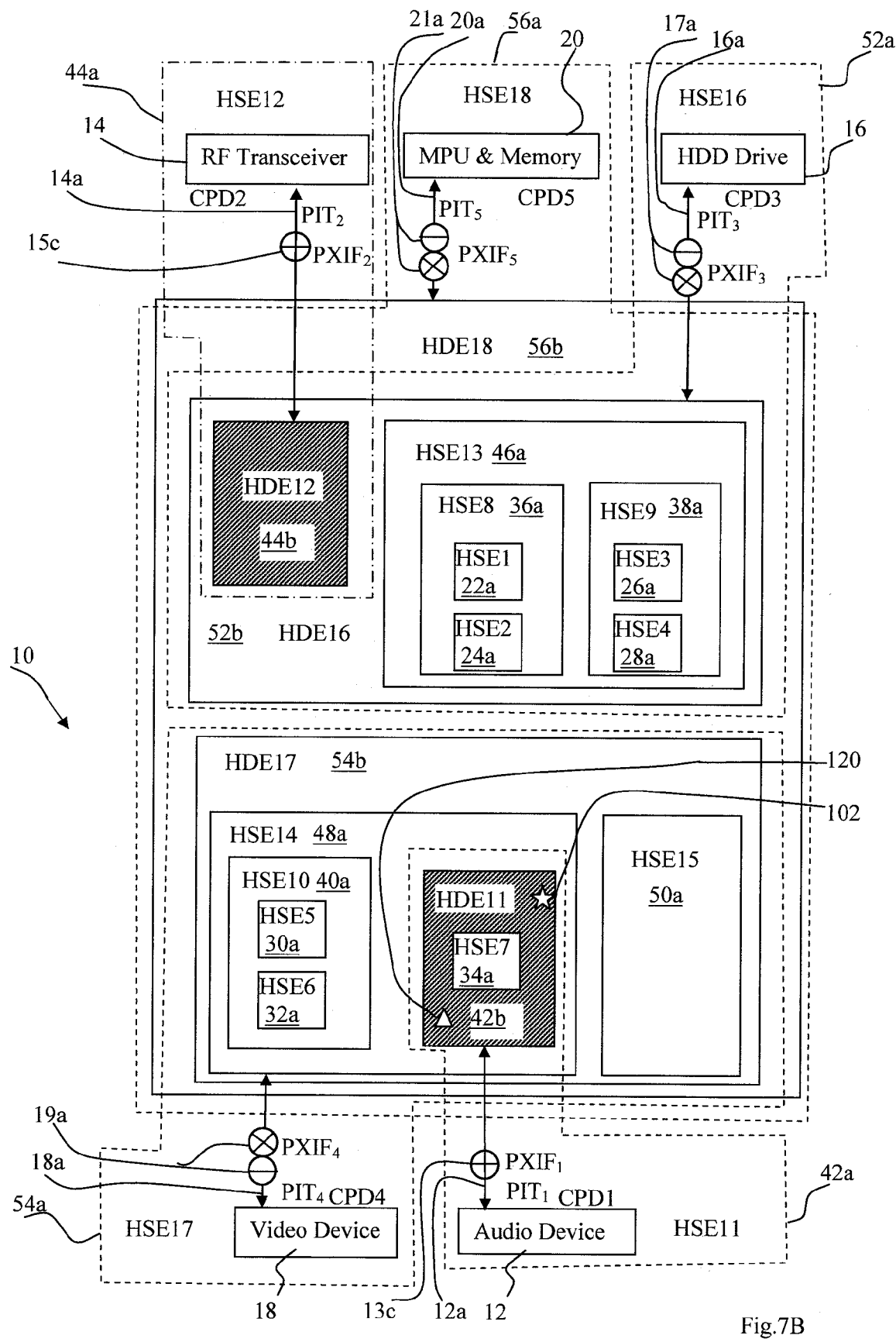
Figure 7C:
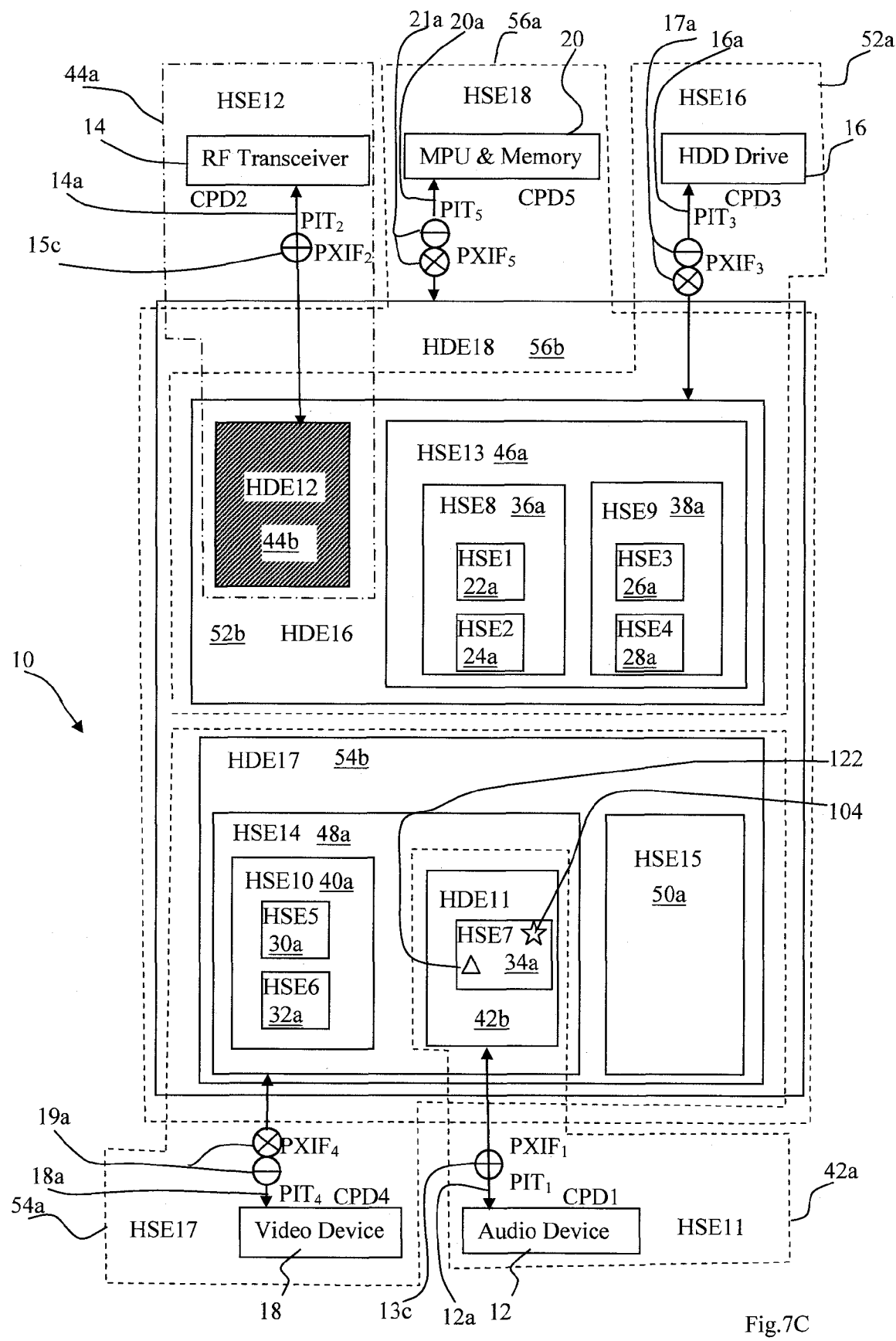
Figure 7D:
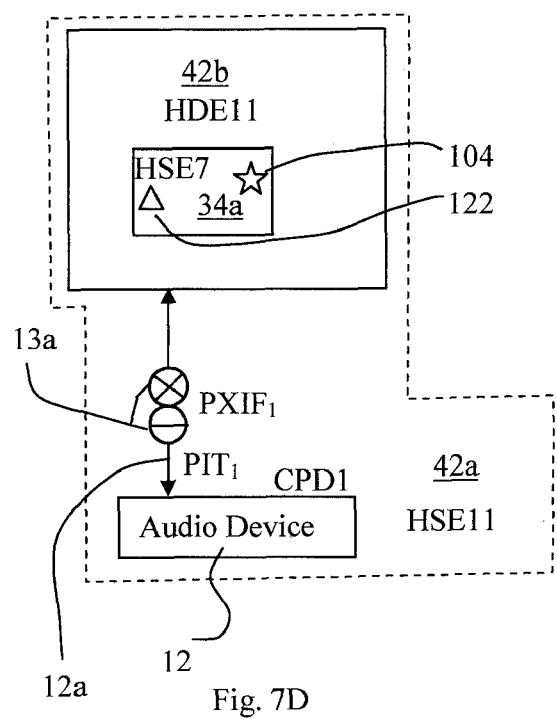
Figure 7E:
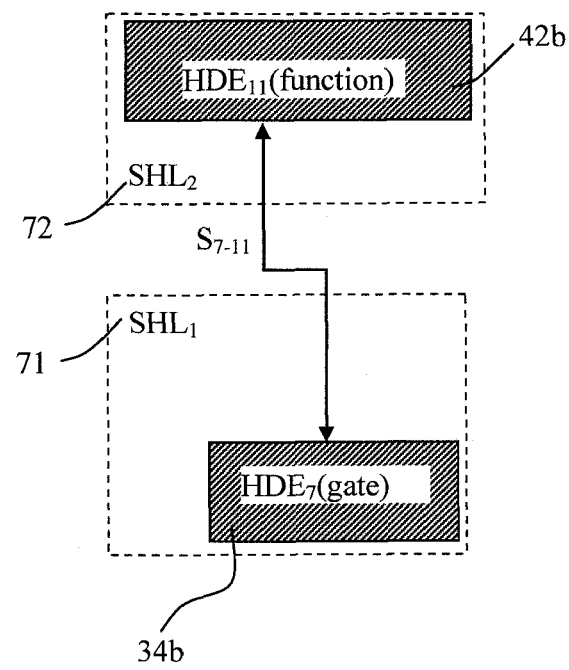
Figure 7F:
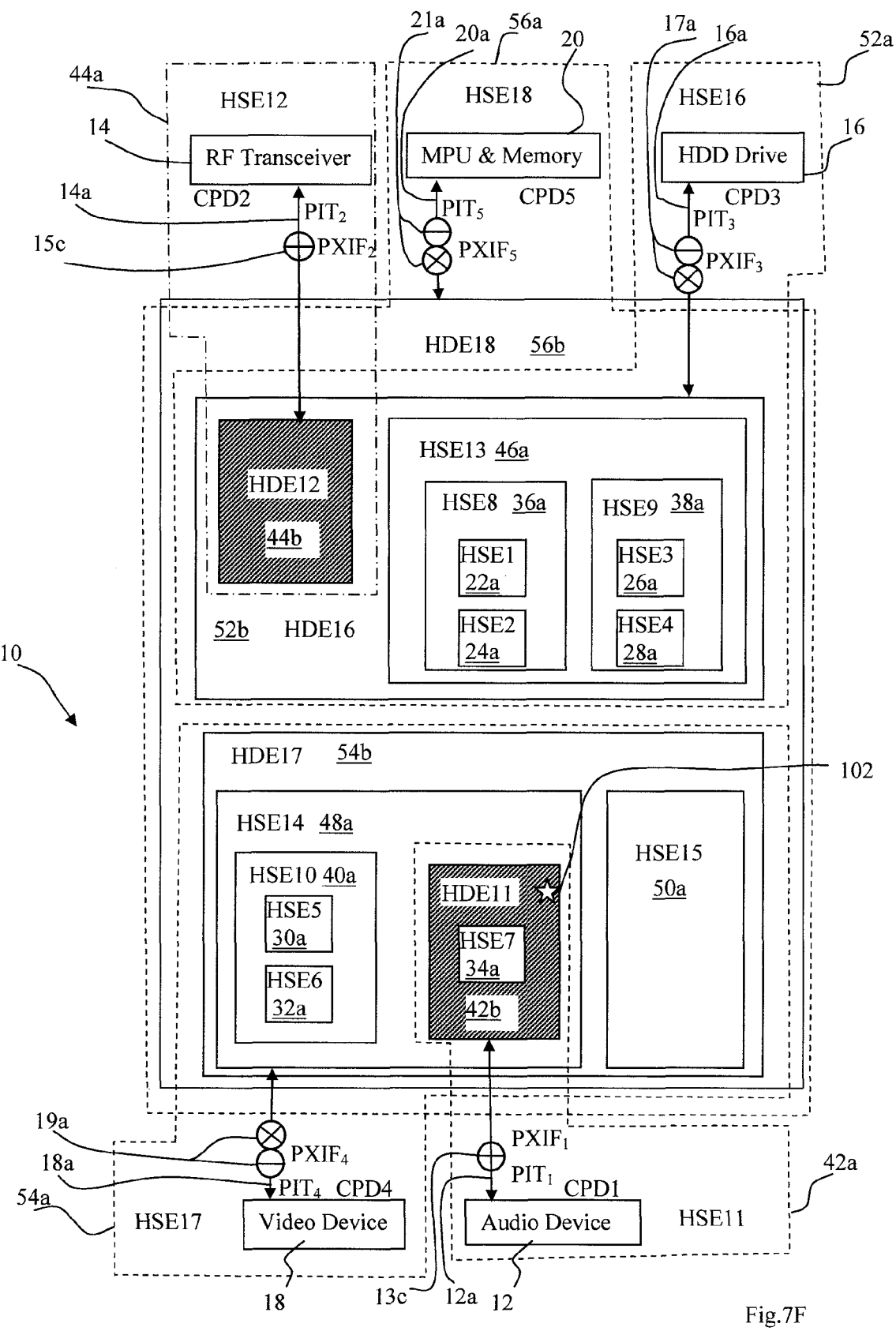
Figure 7G:
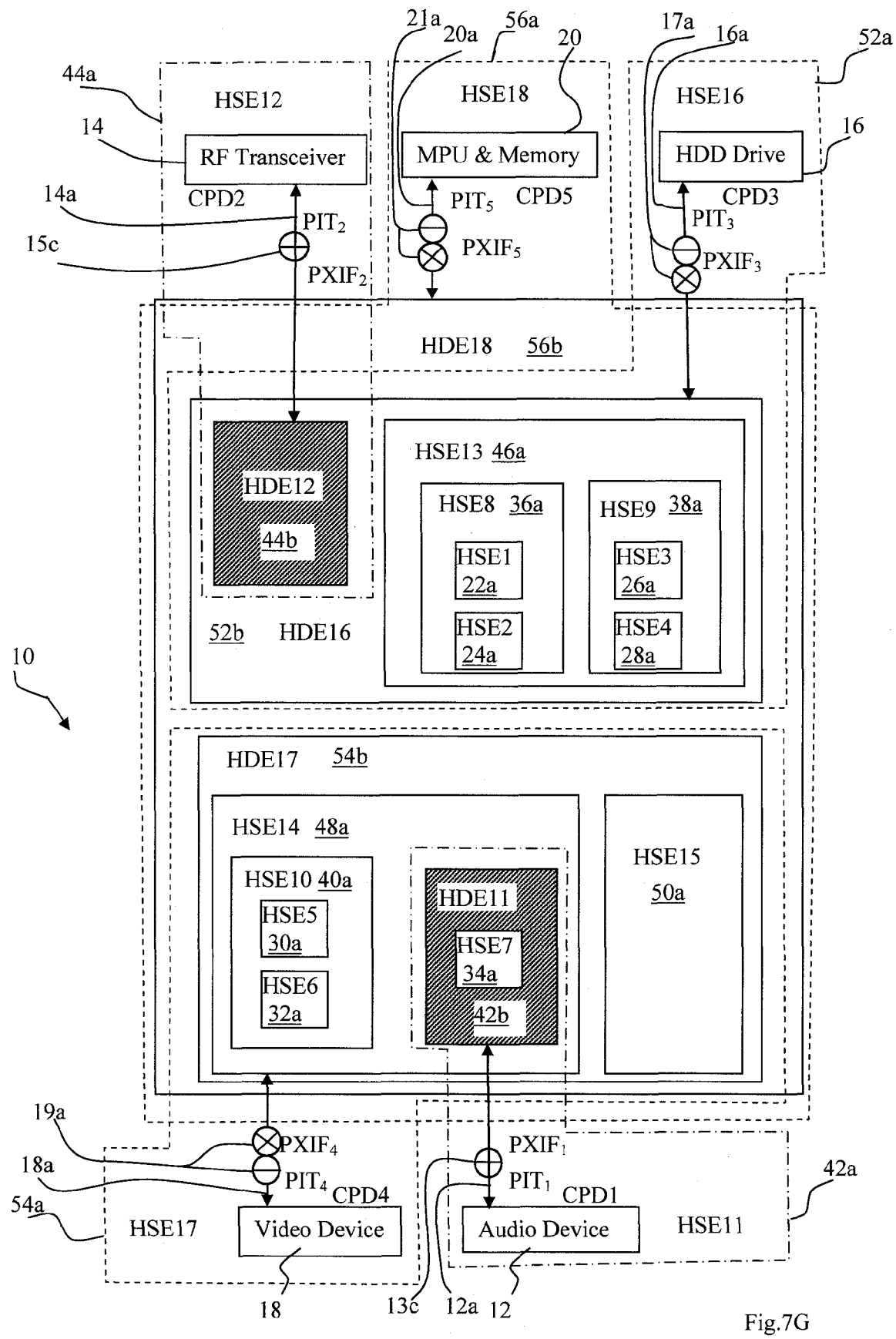

FIG. 7A through FIG. 7G together illustrate an error detection and bug fixing procedure under the present invention while validating an $HSE_{12}$ 44a with an enabled $PXIF_2$ 15c for CPD2 14 (e.g., an RF transceiver) between the third state and the fourth state of progression of the hardware and the EDA software. While validating the $HSE_{12}$ 44a at $SHL_3$ 73, an error is encountered that is apparently related to audio data reception and playback through the $HSE_{12}$ 44a and the $HSE_{11}$ 42a. Notice that $HSE_{12}$ 44a is coupled to CPD2 14 via an enabled $PXIF_2$ 15c while $HSE_{11}$ 42a is coupled to CPD1 12 (Audio Device) via an enabled $PXIF_1$ 13c. To accurately locate the error source within the electronic system design 200, an error detector 100 is inserted inside $HSE_{12}$ 44a by programming the RPLD. A second error detector 102 is also inserted inside $HSE_{11}$ 42a by programming the RPLD as illustrated in FIG. 7A. In FIG. 7B, upon further validating activity, as no error inside $HSE_{12}$ 44a is detected by the error detector 100, error detector 100 is therefore removed by programming the RPLD. On the other hand, the error detector 102 does detect an error inside $HSE_{11}$ 42a and hence a quarantine area 120 is set up inside $HSE_{11}$ 42a at $SHL_2$ 72, again by programming the RPLD, to refine the location of the error source. In FIG. 7C, upon further validating activity with analysis using the error detector 102 and the quarantine area 120 a bug is located to be inside $HSE_7$ 34a at the lowest $SHL_1$ 71. Thus, another error detector 104 and another quarantine area 122 are created inside $HSE_7$ 34a to pin point the precise location of the bug. As the bug ultimately resides in the electronic system design 200, FIG. 7D and FIG. 7E together illustrate a temporary retreat back to the EDA software simulation environment to fix the bug. In FIG. 7D the CPD1 12 is, through the disabled $PXIF_1$ 13a under condition (B), decoupled from the $HDE_{11}$ 42b to facilitate its software simulation with a correspondingly appended test bench. In FIG. 7E both $HDE_7$ 34b and $HDE_{11}$ 42b are re-simulated and re-verified after the bug inside $HDE_7$ 34b is fixed at $SHL_1$ 71. Afterwards, FIG. 7F illustrates the re-validation of $HSE_{11}$ 42a at $SHL_2$ 72, with a re-enabled $PXIF_1$ 13c coupling the CPD1 12 in the presence of the error detector 102. As no error is found this time, the error detector 102 is removed and FIG. 7G illustrates the now successful validation of $HSE_{12}$ 44a at $SHL_3$ 73 with the re-enabled $PXIF_2$ 15c for CPD2 14 (RF transceiver).

Figure 8A:
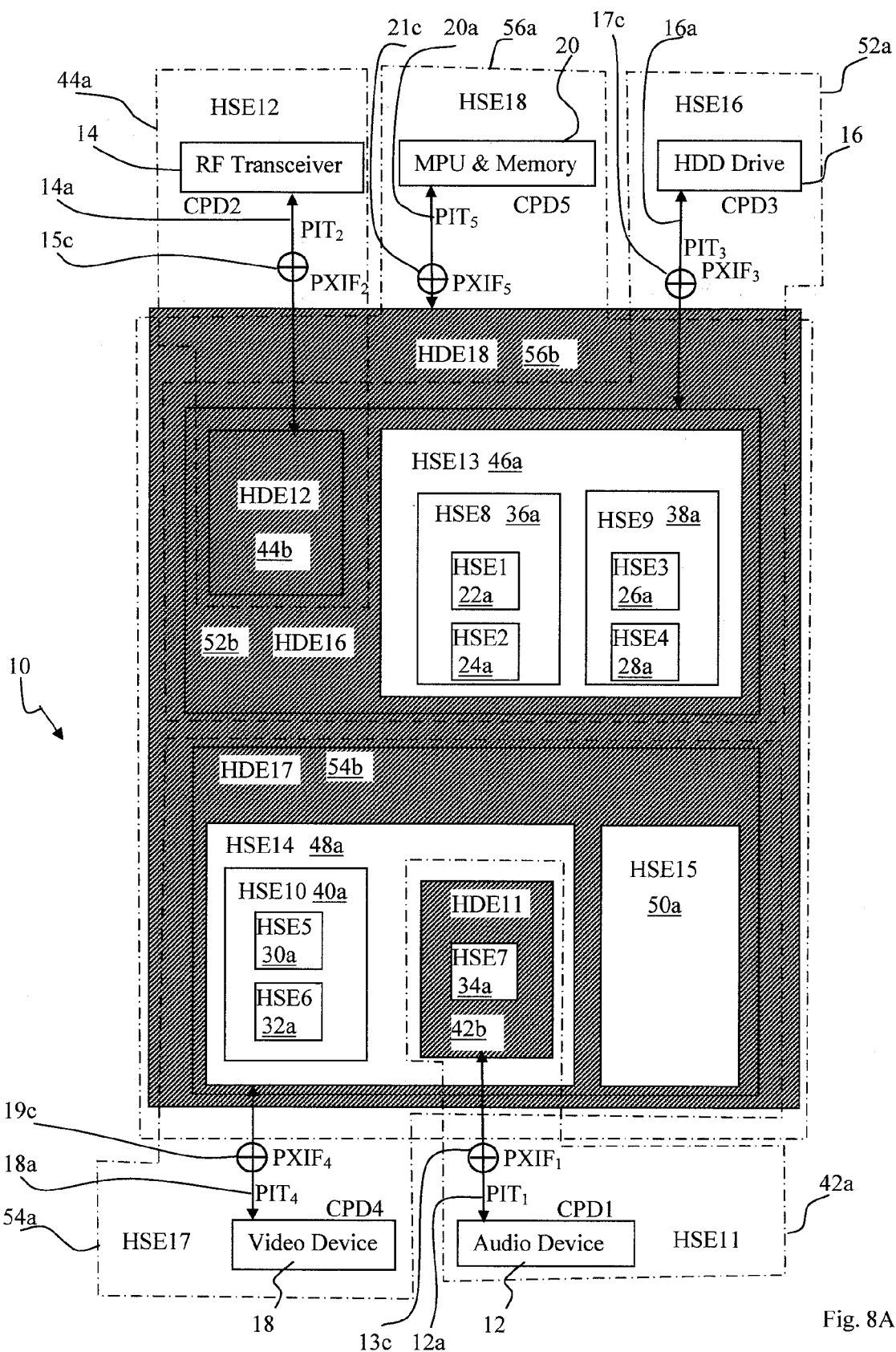
Figure 8B:
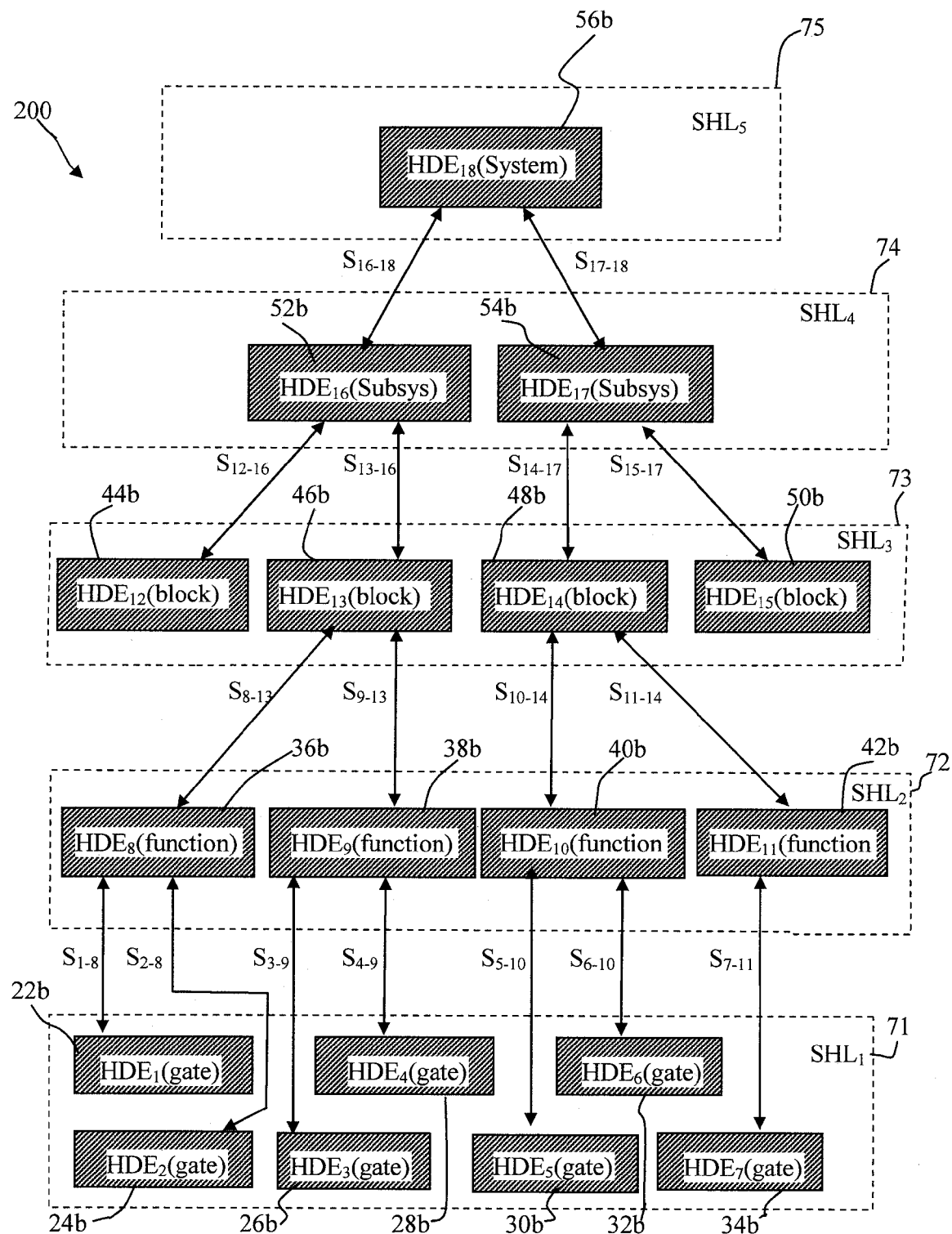

FIG. 8A and FIG. 8B together illustrate a sixth state of progression of the hardware and the EDA software upon completion of the verification and validation process at the highest system hierarchy level $SHL_5$ 75 of the customer's electronic system design 200. Here, $HDE_{18}$ 56b together with its test bench have been simulated and verified with a simulation software tool. Thereafter, $HDE_{18}$ 56b is configured and programmed, placed and routed into $HSE_{18}$ 56a on the RPLD. During the simulation and verification of $HDE_{18}$ 56b the test bench of $HDE_{18}$ 56b has been appended with stimuli and responses to form an appended test bench for $HDE_{18}$ 56b with the appended stimuli and responses reflecting the interactive behavior of CPD5 20. After successful verification, the verified $HDE_{18}$ 56b is configured and programmed on the RPLD. The appended test bench is then removed and the $PXIF_5$ enabled (into condition (C)) by programming via the RPLD-interface. The electronic system prototype 10 is then validated against the whole functional validation specification—i.e., the so-built prototype in RPLD expects to become the product upon final product-level packaging. Here again, $HDE_{18}$ 56b is qualified for the hybrid prototyping process between the fifth state and the sixth state of progression of the hardware and the EDA software. While the CPD5 20 (MPU & Memory) is shown last enabled during the validation process, in many cases of validating a complex multi-media device CPD (e.g., the CPD1 12 audio device) with high significance, the CPD5 20 (MPU & Memory) should also be enabled, so as to be able to use the CPD5 20 to program or play the CPD1 12 (Audio Device) for validation.

As a general remark, while the present invention has been described in terms of the following specific system hierarchy levels:

$SHL_1$ 71: gate.
$SHL_2$ 72: function.
$SHL_3$ 73: block.
$SHL_4$ 74: subsystem.
$SHL_5$ 75: system.

To those skilled in the art the present invention method is applicable to other abstraction of system hierarchy levels as well. The following lists a few examples of such other system hierarchy levels:

Transistor, switch, logic (AND, OR, XOR), function (adder, multiplier, arithmetic logic unit (ALU)), behavior (interaction between functions).

On the hardware side, for those customers already in possession of a customer RPLD, only the following steps need to be carried out to make the customer RPLD usable under the present invention:

1. Inserting and configuring, via programming, the RPLD-interface into the customer RPLD.
2. Inserting and configuring, via programming, the PXIFs into the customer RPLD and respectively connecting them to the PITs.

In this way, a cost-saving related to the RPLD is realized. In more detail, inserting and configuring the RPLD-interface can include inserting a set of vector generator, configuration interface, error detectors and error alarm into the customer RPLD.

On the software side, for customers already in possession of a test pattern generator and a customer simulation software tool capable of simulating and verifying the HDEs, only the following steps need to be carried out to make the customer simulation software usable under the present invention:

Providing a vector generation tool that interfaces with the customer simulation software and the test pattern generator to functionally interact with the design data.

In this way, a cost-saving related to the test pattern generator and the simulation software tool is realized. In more detail, providing the vector generation tool can include providing a set of configurable simulator interface, configurable test pattern generator, error detector and error analyzer.

While the description above contains many specificities, these specificities should not be constructed as accordingly limiting the scope of the present invention but as merely providing illustrations of numerous presently preferred embodiments of this invention. To those skilled in the art, a method of progressively simulating, prototyping and validating a customer's electronic system design on a reprogrammable logic device with attached customer peripheral devices is invented for general application. Throughout the description and drawings, numerous exemplary embodiments were given with reference to specific configurations. It will be appreciated by those of ordinary skill in the art that the present invention can be embodied in numerous other specific forms and those of ordinary skill in the art would be able to practice such other embodiments without undue experimentation. The scope of the present invention, for the purpose of the present patent document, is hence not limited merely to the specific exemplary embodiments of the foregoing description, but rather is indicated by the following claims. Any and all modifications that come within the meaning and range of equivalents within the claims are intended to be considered as being embraced within the spirit and scope of the present invention.

We claim:

1. A method for progressively prototyping and validating a customer's electronic system design (ESD) with design data partitioned into a plurality of hierarchical design elements $HDE_i$ (i=1, 2, ..., M with M≧1) and their respective interconnecting networks and test benches, said ESD further coupling and interacting with a plurality of customer's existing customer peripheral devices $CPD_j$ (j=1, 2, ..., N with N≧1) via their corresponding peripheral interface terminals $PIT_j$ (j=1, 2, ..., N) thus forming a correspondingly interconnected hierarchical system elements $HSE_k$ (k=1, 2, ..., K with k≧1) interacting with one another according to a predefined hierarchically structured functional validation specification, said hierarchical system elements $HSE_k$ further forming a plurality of system hierarchy levels $SHL_m$ (m=1, 2, ..., P with m≧1), the method comprises:
   a) providing a reprogrammable logic device (RPLD) having:
      an RPLD-interface for configuring and programming said RPLD to implement functionally at least a portion of said hierarchical design elements; and
      a plurality of programmable external interfaces $PXIF_j$ (j=1, 2, ..., N) respectively connected to said $PIT_j$ (j=1, 2, ..., N);
   b) providing a simulation software tool for reading the design data, simulating then verifying each of said $HDE_i$, in conjunction with said test benches;
   c) disabling said $PXIF_j$ (j=1, 2, ..., N) via the RPLD-interface and, for each $PXIF_k$ so disabled, identifying those $HDE_i$ having a network connection thereto then appending their test benches with stimulus and response to form appended test benches reflecting the interactive behavior of the corresponding $CPD_k$; and
   d) progressively verifying and validating the set $HSE_k$ (k=1, 2, ..., K) by:
      d1) identifying a set of HSE candidates, each being not yet verified and validated and each having no interconnection to another HSE at a lower system hierarchy level that is not yet verified and validated;
      d2) verifying and validating each member of the HSE candidate set, together with its corresponding hierarchical design elements and customer peripheral devices, with said simulation software in conjunction with said test benches, and said appended test benches, said RPLD and said functional validation specification; and
      d3) repeating steps d1) and d2) till all members of the set $HSE_k$ (k=1, 2, ..., K) are verified and validated whereby complete and validate an RPLD prototype against the functional validation specification.

2. The method for prototyping and validating an ESD of claim 1 wherein verifying and validating a member of the HSE candidate set, when the HSE candidate member only includes a corresponding HDE, further comprises verifying the HDE with said simulation software in conjunction with its respective test bench then converting, by configuring and programming the RPLD, the verified HDE into a corresponding programmed hierarchical element in the RPLD.

3. The method for prototyping and validating an ESD of claim 2 wherein converting the verified HDE into a corresponding programmed hierarchical element further comprises placing and routing all programmed hierarchical elements according to their respective interconnecting networks on the RPLD.

4. The method for prototyping and validating an ESD of claim 1 wherein verifying and validating a member of the HSE candidate set, when the HSE candidate member includes a corresponding HDE and its coupled CPD, further comprises:
- d21) verifying the HDE with said simulation software in conjunction with its respective appended test bench then converting, by configuring and programming the RPLD, the verified HDE into a corresponding programmed hierarchical element in the RPLD;
- d22) removing said respective appended test bench and enabling a PXIF corresponding to the coupled CPD via the RPLD-interface; and
- d23) validating those portions of the functional validation specification corresponding to the RPLD and a subset of the $CPD_j$ (j=1, 2, ..., N) corresponding to an updated set of enabled PXIF.

5. The method for prototyping and validating an ESD of claim 4 wherein converting the verified HDE into a corresponding programmed hierarchical element further comprises placing and routing all programmed hierarchical elements according to their respective interconnecting networks on the RPLD.

6. The method for prototyping and validating an ESD of claim 4 wherein validating those portions of the functional validation specification further comprises validating according to the structural hierarchy of the functional validation specification.

7. The method for prototyping and validating an ESD of claim 1 wherein progressively verifying and validating the set $HSE_k$ (k=1, 2, ..., K) further comprises progressively verifying and validating the set $HSE_k$ (k=1, 2, ..., K) according to an upward direction along the system hierarchy levels $SHL_m$ (m=1, 2, ..., P).

8. The method for prototyping and validating an ESD of claim 1 wherein progressively verifying and validating the set $HSE_k$ (k=1, 2, ..., K), upon detection of an error during a verification or validation process, further comprises temporarily verifying and validating the $HSE_k$ according to a downward direction along the system hierarchy levels $SHL_m$ (m=1, 2, ..., P).

9. The method for prototyping and validating an ESD of claim 8 wherein temporarily verifying and validating the $HSE_k$ according to the downward direction further comprises discovering and fixing a number of bugs in the ESD causing the detected error.

10. The method for prototyping and validating an ESD of claim 9 wherein discovering and fixing a number of bugs further comprises, to monitor the $HSE_k$ behavior, inserting a number of error detectors into the ESD at an $SHL_k$ corresponding to the $HSE_k$ and setting up a quarantine area for further bug fixing in the downward direction.

11. The method for prototyping and validating an ESD of claim 1 wherein verifying and validating a member of the HSE candidate set with said simulation software further comprises, for at least one stage of the verification and validation progression, identifying a set of hierarchical system elements with no overlapping of their respective input/output signals, thus named parallel hierarchical system elements, and simultaneously simulating and verifying their corresponding hierarchical design elements with said simulation software thereby increase the prototyping and validating throughput.

12. The method for prototyping and validating an ESD of claim 1 wherein verifying and validating a member of the HSE candidate set with said simulation software further comprises, for those hierarchical system elements under verification whose input signals include at least one signal coming from an already programmed hierarchical element, sampling said at least one signal from the already programmed hierarchical element and inputting the value of said at least one signal into said simulation software thereby realize a hybrid prototyping process of joint hardware software simulation with increased prototyping throughput.

13. The method for prototyping and validating an ESD of claim 12 wherein converting the verified HDE into its corresponding programmed hierarchical element further comprises
- programming the RPLD to implement an output data ready signal as part of the output of said programmed hierarchical element,
- indicating the state of validity of its output signals following a change of any of its input signals, and then
- conditionally sampling said at least one signal according to the state of said output data ready signal to prevent sampling a false signal there from due to logic and hardware propagation delay.

14. The method for prototyping and validating an ESD of claim 1 wherein said RPLD is a programmably interconnected array of field programmable gate arrays (FPGA).

15. The method for prototyping and validating an ESD of claim 1 where, for those customers already in possession of a customer RPLD, providing an RPLD further comprises: inserting and configuring, via programming, said RPLD-interface into the customer RPLD; and inserting and configuring, via programming, said plurality of $PXIF_j$(j=1, 2, ..., N) into the customer RPLD and respectively connecting them to said $PIT_j$(j=1, 2, ..., N) thereby realize a cost saving related to the RPLD.

16. The method for prototyping and validating an ESD of claim 15 wherein inserting and configuring said RPLD-interface further comprises inserting a set of vector generator, configuration interface, error detectors and error alarm into the customer RPLD.

17. The method for prototyping and validating an ESD of claim 1 where, for those customers already in possession of a test pattern generator and a customer simulation software tool for simulating and verifying said hierarchical design elements, providing a simulation software tool further comprises providing a vector generation tool, interfacing with the customer simulation software and the test pattern generator, to functionally interact with the design data thereby realize a cost saving related to the test pattern generator and the simulation software tool.

18. The method for prototyping and validating an ESD of claim 17 where providing a vector generation tool further comprises providing a set of configurable simulator interface, configurable test pattern generator, error detector and error analyzer.

19. A method for progressively prototyping and validating a customer's electronic system design (ESD) with design data partitioned into a plurality of hierarchical design elements (HDEs) plus their respective interconnecting networks and test benches, said ESD further coupling and interacting with a plurality of customer's existing customer peripheral devices (CPDs) via their corresponding peripheral interface terminals (PITs) thus forming a correspondingly interconnected hierarchical system elements (HSEs) interacting with one another according to a pre-defined hierarchically structured functional validation specification, said HSEs further forming a plurality of system hierarchy levels (SHLs), the method comprises:

a) providing a reprogrammable logic device (RPLD) having:
   an RPLD-interface for configuring and programming said RPLD to implement functionally at least a portion of said hierarchical design elements; and
   a plurality of programmable external interfaces (PXIFs) respectively connected to said PITs;
b) providing a simulation software tool for reading the design data, simulating then verifying, in conjunction with said test benches, each of said HDEs;
c) disabling said PXIFs via the RPLD-interface and, for each PXIF so disabled, identifying those HDEs having a network connection thereto then appending their test benches with stimulus and response to form appended test benches reflecting the interactive behavior of the corresponding CPD; and
d) progressively verifying and validating all the HSEs by:
   d1) identifying a set of HSE candidates, each being not yet verified and validated and each having no interconnection to another HSE at a lower system hierarchy level that is not yet verified and validated;
   d2) verifying and validating each member of the HSE candidate set, together with its corresponding hierarchical design elements and customer peripheral devices, with said simulation software in conjunction with said test benches, said appended test benches, said RPLD and said functional validation specification; and
   d3) repeating steps d1) and d2) till all the HSEs are verified and validated whereby complete and validate an RPLD prototype against the functional validation specification.

* * * * *